United States Patent [19]

Ferrel et al.

[11] Patent Number: 5,878,421
[45] Date of Patent: *Mar. 2, 1999

[54] INFORMATION MAP

[75] Inventors: Patrick J. Ferrel, Seattle; Robert F. Meyer, Redmond; Stephen J. Millet, Seattle; John P. Shewchuk, Seattle; Walter W. Smith, Seattle, all of Wash.

[73] Assignee: Microsoft Corporation, Redmond, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 503,139
[22] Filed: Jul. 17, 1995
[51] Int. Cl.⁶ ...................................... G06F 17/30
[52] U.S. Cl. .................. 707/100; 707/1; 707/2; 707/3; 707/101; 707/104
[58] Field of Search ..................... 395/611, 615, 395/762, 774, 604; 707/2, 1, 104, 3, 101, 100

[56] References Cited

U.S. PATENT DOCUMENTS

| | | |
|---|---|---|
| 5,347,632 | 9/1994 | Filepp et al. ................. 395/200.32 |
| 5,408,655 | 4/1995 | Oren et al. ............................. 395/601 |
| 5,418,942 | 5/1995 | Krawchuk et al. ................... 395/604 |
| 5,548,770 | 8/1996 | Bridges ...................................... 707/2 |
| 5,557,722 | 9/1996 | DeRose et al. ........................ 395/774 |
| 5,564,119 | 10/1996 | Krawchuk et al. ................... 395/614 |
| 5,594,837 | 1/1997 | Noyes ..................................... 395/54 |
| 5,675,788 | 10/1997 | Husick et al. ......................... 707/104 |

*Primary Examiner*—Paul R. Lintz
*Attorney, Agent, or Firm*—Banner & Witcoff

[57] ABSTRACT

One of the controls on a page can call an information map at the time that the page which contains the control is being rendered. The information map interface provides access to the structure of both the title and the content within the title. The control can then display this structural information in any form it desires since it renders itself on the page at the customer computer. Navigation through the title is based on the customer's interactions with the information map control, i.e., clicking on a navigation link causes the title to navigate to that location. The information map determines which piece of the title and content structure to show, and the visual form in which it is shown. Information maps may have other applications including the efficient creation and modification of timelines and geographic maps in multimedia encyclopedias (e.g., Microsoft Encarta), as well as virtual reality programs.

13 Claims, 17 Drawing Sheets

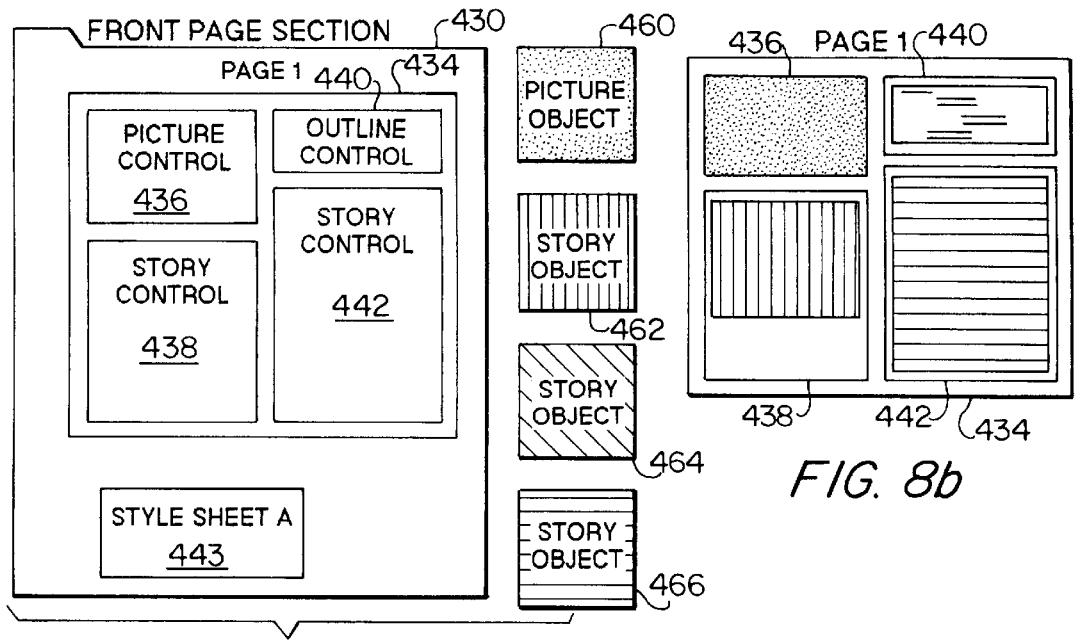
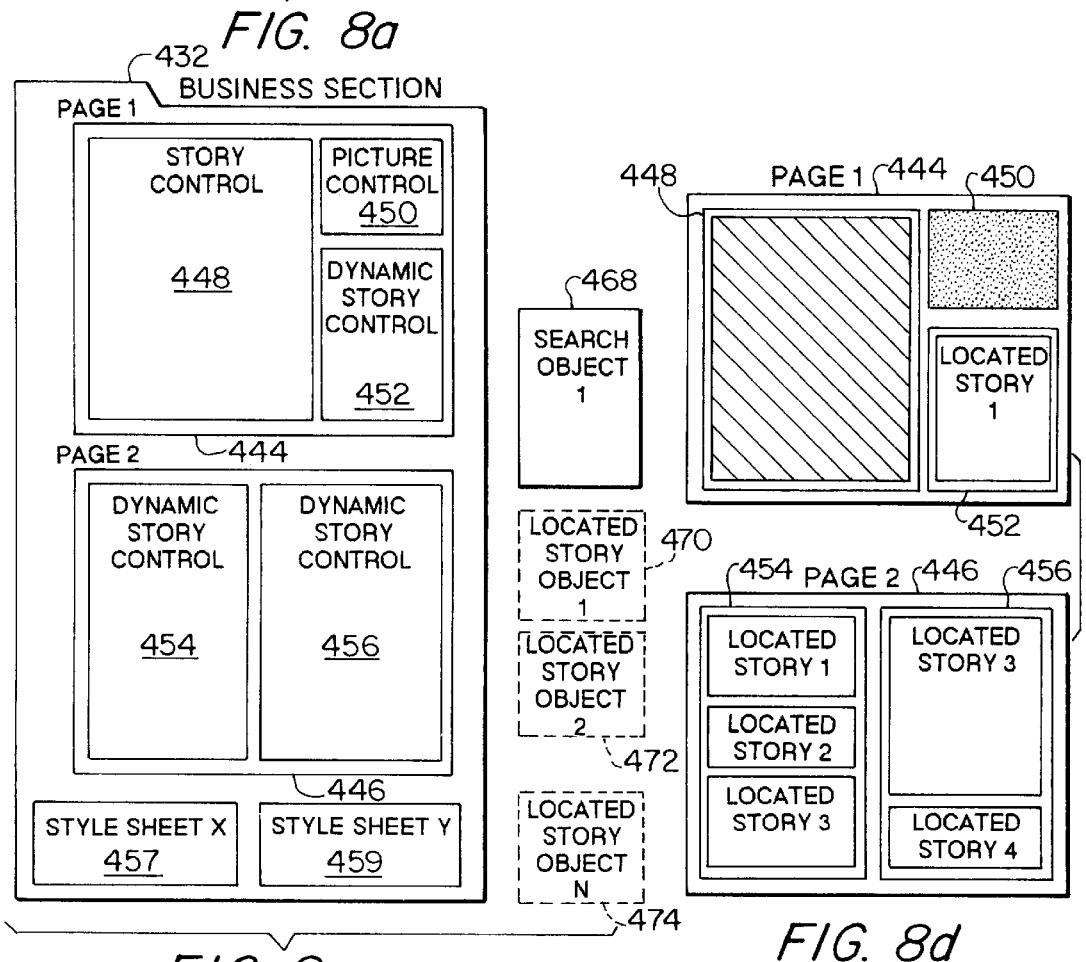
FIG. 8a
FIG. 8b
FIG. 8c
FIG. 8d

VIEWER

COMPOSE OUTLINE CONTROL

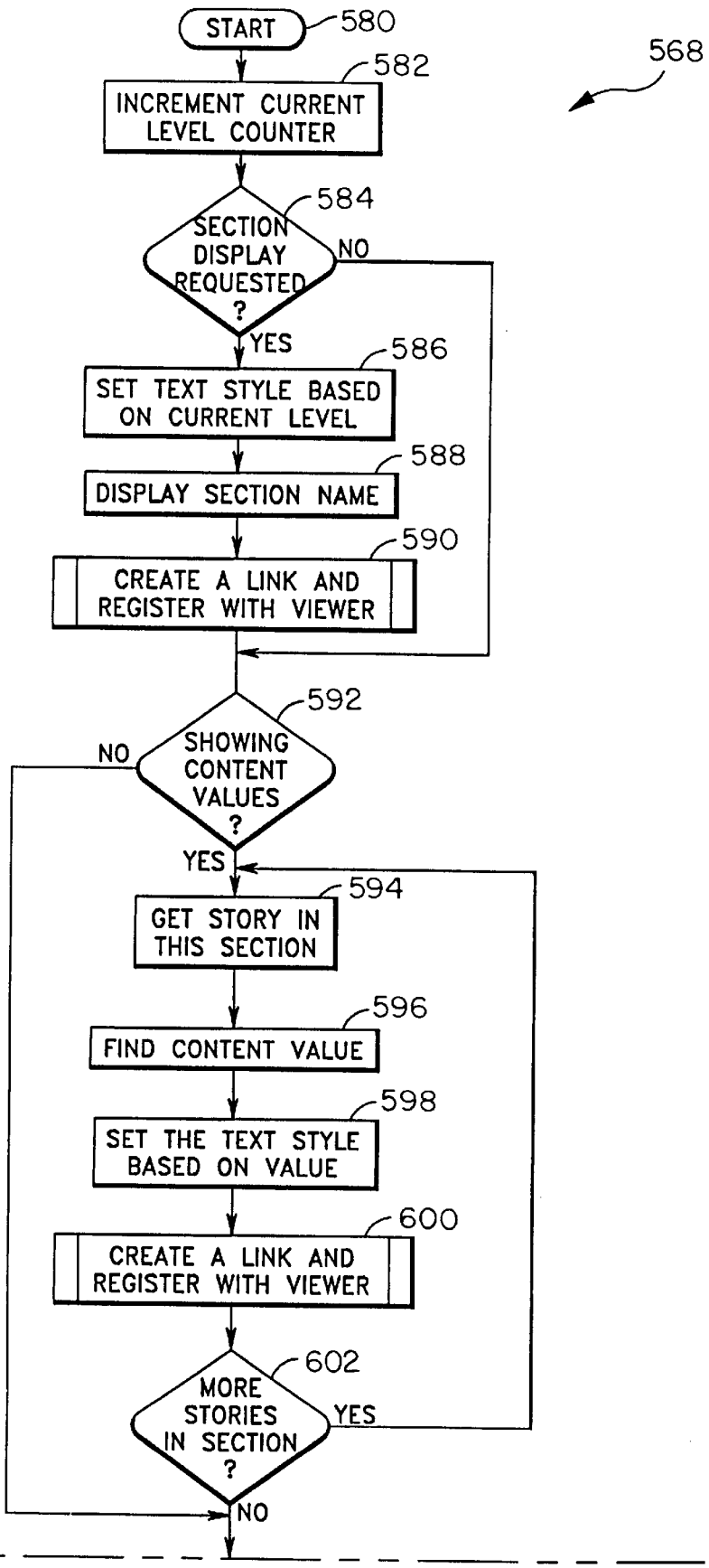
FIG. 13a COMPOSE THIS SECTION

COMPOSE THIS
SECTION

CREATE A LINK AND
REGISTER WITH VIEWER

NAVIGATE TITLE
THROUGH LINK

INFORMATION MAP

BACKGROUND OF THE INVENTION

1. Field of the Invention

The present invention relates to electronic publishing systems and, more specifically, to automatically creating navigation links in a publication.

2. Description of the Related Technology

Content providers wish to frequently update the content within their titles. Traditionally, this requires hand-authoring display and navigation tools within the title, e.g., the Table of Contents, every time the content changes. This is a time-consuming and error-prone process, involving:

hand-authoring the items in the list hand-authoring links to the actual content formatting the items in the list to make them visually compelling This is a serious impediment to quick release of time-sensitive content (e.g. stock trade reports, news reports, special discounts on merchandise).

Related systems such as file viewers, desktop publishing software and existing electronic publishing systems do not solve this important problem.

The display of hierarchical structures is commonly used in files systems. As examples, the File Manager in Microsoft Windows or the Explorer in Windows 95 provide such a capability. In such a system, when a user activates a file, by clicking on a mouse, the application program associated with the file is started by the operating system, or the application itself is started. This type of hierarchical display does not, however, allow for navigation of a single integrated hypermedia document, i.e., a single document containing links to multiple media.

Many different systems exist for publishing documents on a computer system. These systems are used to, for example, create newsletters or brochures to promote a particular company. In addition, publications can be used to disseminate information to a variety of customers. A number of programs exist for allowing a user to design complicated layouts for a particular application. Well-known programs such as Microsoft Publisher®, Ventura Publisher®, PageMaker®, and PrintShop® help a user to produce attractive newsletters and brochures.

Another category of publication systems include software for electronically publishing stories across on-line networks such as CompuServe, America On-Line, or the Internet. Most of these systems create and display stories that are formatted in a Standard Generalized Markup Language (SGML) or Hypertext Markup Language (HTML). Both the HTML and SGML are standards for tagging text in documents to be displayed in an on-line network. Documents that are formatted in HTML or SGML can be viewed by several widely distributed browsers such as Mosaic and NetScape for the Internet. These browser programs read SGML and HTML tagged documents and display them with proper formatting.

Several programs exist for producing documents that are tagged in either the SGML and HTML format. Programs such as Interleaf's WorldView 2 allow a user to create an SGML document with, for instance, bold-face text and hyperlinks to other documents. A hyperlink, also known as a navigation link, is a user selectable portion of a screen display which, when activated by a user event such as a mouse click, causes the viewing program to navigate to another portion of the displayed document.

Once a document has been saved in an SGML format, it can be read by either the Mosaic or NetScape browser. Unfortunately, all of the navigation links for text or graphics in an SGML or HTML document are embedded within the document. The Mosaic or NetScape browsers do not reformat these tagged documents, but rather only display the commands embedded in the SGML or HTML documents to a user. For this reason, the designers that produce the SGML and HTML documents must add navigation links to every new document. Therefore, the process of creating documents for display using SGML or HTML is very inefficient for the document designer.

Other commercially available software programs for producing on-line publications are available in the marketplace. One type of electronic publisher that generates its own specific format of text while retaining the specific layout of the document is the Adobe Acrobat™ software package. Acrobat™ reads and stores documents in a specialized format known as the Portable Document Format (PDF) for use on the Internet. Other electronic publishing programs are produced by Interleaf, Inc. (Waltham, Mass.), Farallon Computing (Alameda, Calif.) and Common Ground Software (Belmont, Calif.).

None of the known file viewers, desktop or on-line electronic publishing systems provide a way to automate the insertion of navigation links which is desired to overcome the shortcomings of known systems.

SUMMARY OF THE INVENTION

This patent describes a method for allowing automated generation of visually rich display and navigation tools within a multimedia title, with little or no a priori knowledge of the exact contents of the title.

The MPS system allows any object which conforms to the OLE Custom Control specification to be placed in a title. The system also provides an interface that the outline control (an embodiment of an information map) can call at the time that the page which contains the control is being rendered, which gives them access to the structure of both the title and the content within the title. The control can then display this structural information in any form it desires (since it renders itself on the page), and can use the same interface to cause navigation through the title based on the user's interactions with the outline control (i.e. clicking on a particular piece of the structure would cause the title to navigate to that location). The information map has complete control over which pieces of the title and content structure to show, and the visual form in which it is shown. Thus, this same invention that enables the outline control, a Table of Contents information map which displays sections and story titles in outline form, can also be embodied as a geographic map which finds within the structure of each story a reference to a particular location, displays that location on the map, and causes navigation to that story when the user clicks on the location. It also enables 3-D "virtual reality" navigation, timelines, and an arbitrary set of other possible displays of the structure. Since the information is made available when the title is being composed, the content provider is able to replace the content within the title freely, and the information maps automatically re-generates new displays with up-to-date information the next time the title is viewed.

In one aspect of the present invention, a method of generating a navigable outline for a title structure comprising a plurality of related nodes, the method comprising the steps of (a) accessing the title structure; (b) finding a node in the title structure; (c) creating a navigation link for the node; and (d) recursively descending the title structure for steps (b) and (c).

In another aspect of the present invention, in an electronic publication system including a designer, a storage and a viewer, a method comprising the steps of creating a title layout including at least one page object; creating a content object having a plurality of content values; releasing the title layout and the content object as a title to the storage; retrieving the title layout and the content object from the storage; composing an outline of navigational links on the displayable page representation of the page object, the outline representative of the title layout and the content values; and moving through the title by activation of one of the navigational links.

In yet another aspect of the present invention, a method of displaying navigable links indicative of a title structure comprising sections containing stories, the method comprising the steps of accessing the title structure; displaying one of the section names; creating a navigation link indicative of the section name; locating a story in the title structure; and creating a navigation link indicative of the story.

BRIEF DESCRIPTION OF THE DRAWINGS

FIG. 8 is a block diagram of the interaction of page layouts, controls, and style sheet and content objects at the viewer of FIG. 2.

DETAILED DESCRIPTION OF THE PREFERRED EMBODIMENTS

Figure 1:
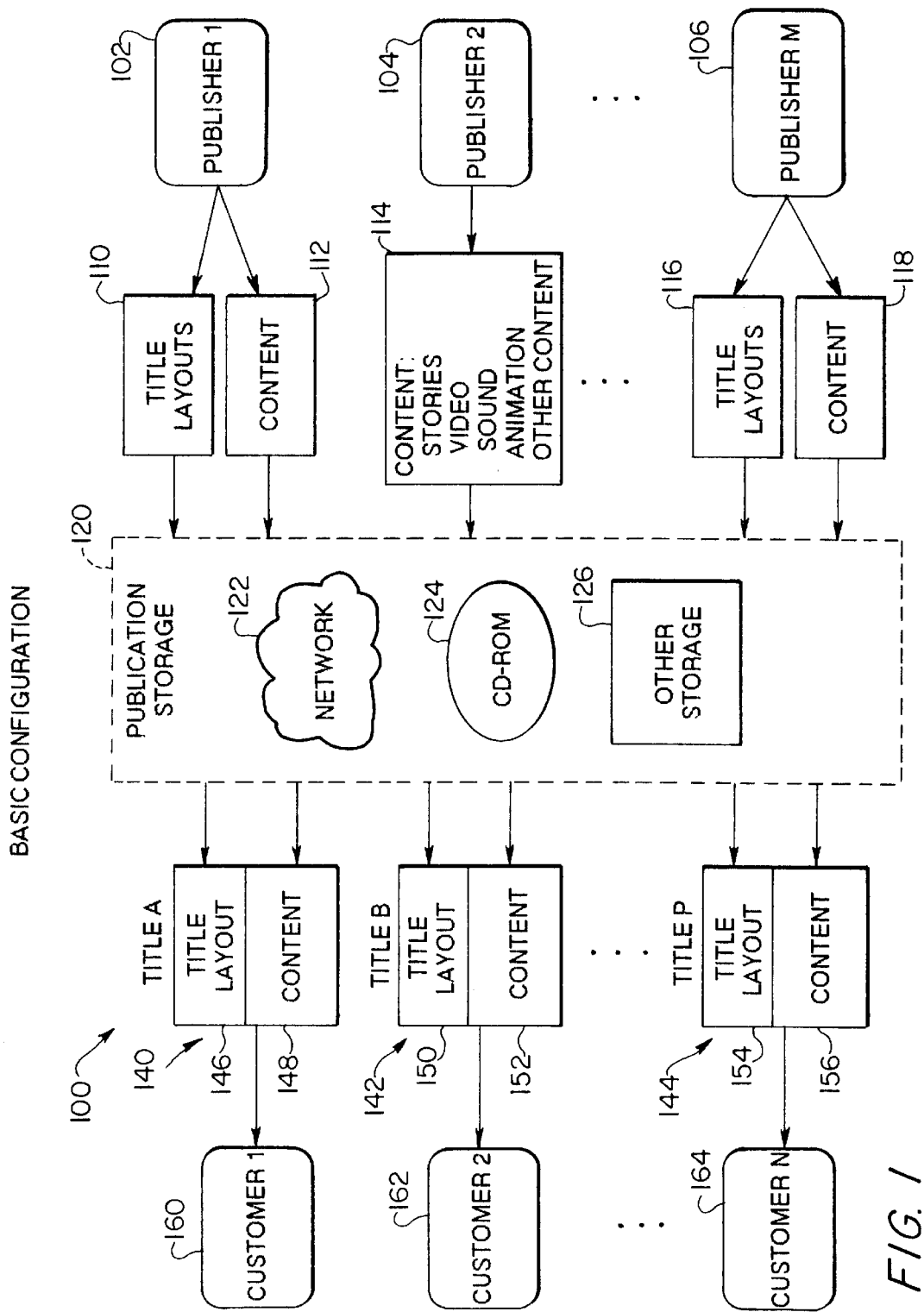
FIG. 1 is block diagram of the basic system configuration of the multimedia publishing system (MPS), which is presently preferred underlying architecture for the present invention.

Reference is now made to the drawings wherein like numerals refer to like parts throughout. For convenience, the following description will be organized into the following seven principal sections: Acronyms, Advantages of the Multimedia Publication System, Multimedia Publishing System Overview, Information Map Overview, Outline Control Implementation, Encyclopedia Timeline Implementation and Summary.

The discussion in the first three sections is general background of the preferred Multimedia Publication System (MPS). The remaining sections focus on the preferred implementation of information maps within the MPS.

I. ACRONYMS

The following list of acronyms is provided as a reference in reading the remaining sections.
AVI—Advanced Video Imaging.
BBS—Bulletin Board System.
MPML—Multimedia Publishing Markup Language
CF—Component Forms
COS—Caching Object Store
DBM—Database Management System
DLL—Dynamic Link Library
GUID—Globally Unique Identifier
HTML—HyperText Markup Language
ICP—Independent Content Provider
IM—Information Magnet
IR—Information Retrieval
IP—Information Provider
LAN—Local Area Network
MP—Multimedia Publishing
MPC—Microsoft Network Procedure Call
MPS—Multimedia Publishing System
MFC—Microsoft Foundation Class
MSN—Microsoft Network
OCX—OLE Control
OFS—Object File System
OLE—Object Linking and Embedding
PDA—Personal Digital Assistant
PSF—Primary Story Flow
RPC—Remote Procedure Call
RTF—Rich Text Format
SGML—Standard Generalized Markup Language
VBA—Visual Basic for Applications
WAN—Wide Area Network
WWW—World-Wide Web

II. ADVANTAGES OF THE MULTIMEDIA PUBLICATION SYSTEM

The present invention can perhaps provide the most benefit by using an on-line network. Therefore, this and the following sections present background information on a preferred on-line publication system which is a foundation upon which the present invention can reside.

To enable a new generation of on-line, multimedia applications, an end-to-end system has been invented for developing and using applications and services. The system, called the Multimedia Publishing System (MPS or MP system), preferably uses the Microsoft Network. As an open, turnkey system, MPS includes components for design, authoring, distribution, viewing, search, personalization, and billing of on-line services and multimedia applications. The MP system allows content providers to offer rich, interactive multimedia applications and services, providing users a compelling and exciting on-line experience. The MP system provides the key to overcoming the previously described hurdles facing the on-line industry.

The Microsoft Network removes the primary barriers to on-line service use. These barriers include cost, difficult user interfaces and lack of inertia. Access to The Microsoft Network is provided by Windows 95, the most recent version of the Microsoft Windows operating system thereby making it accessible to millions of customers. The Microsoft Network is designed to make accessing electronic information easy and inexpensive for any user of Windows 95.

In the MP system, Independent Content Providers (ICPs), also known as publishers, supply the system with stories, publications, newspapers, sounds, graphics movies and much more. The MP system is designed to take projects (e.g. stories, publications, and so forth) produced by the publishers and make them accessible to millions of users on the Microsoft Network. Thus, the basic components of the MP system are a project designer component, a public distribution site, and a viewer component. These components of the MP system are described in detail below.

One unique concept that permeates the MP system is the clean separation of content and design. In this context, content is defined as the actual data that is to be displayed to the user. The design of a project is how that information gets displayed to the user (e.g., its format on the computer screen). An illustrative example would be an electronic newspaper, wherein the content is the text and graphics of the stories, while the design is the layout and style of that data. The design of the electronic newspaper is what makes it look like a newspaper on a computer monitor, whereas the content is the data that makes up the designed screens.

In the MP system, the content and the design are stored as separate objects in the public distribution site so that many different pieces of content can be viewed with the same appearance. An object can be defined as a discrete data item or data structure which can be stored in persistent storage or in memory. The object may include computer instructions for manipulating the data. Once a designer using the project designer component at the publisher site has created a particular page layout that is attractive, many pieces of content can be viewed from within that layout because of the separation of content from design in the MP system. The system keeps track of links between a piece of content and its associated page layout, but does not actually format the data in the content with a particular style. This is one tremendous advantage that the MP system has over other on-line publishing systems such as Mosaic or Netscape.

As will be discussed in more detail below, the designer creates projects with design and content information for a particular publisher. Continuing the example from above, a project could correspond to an entity that owned a series of newspapers and other media businesses. Within each project, one or more titles would correspond to the actual newspaper. Each title has one or more sections, and can be thought of as similar to the sections in a standard, printed daily newspaper or other periodical such as a magazine.

Within each section are pages that define the information that is displayed to a single screen on the customer's computer visual display. When viewing a particular title, the customer will normally look at only one page of information at a time. On each page are controls which contain instructions for gathering, formatting and displaying the linked content onto the page. When a customer looks at information on a page that is provided by a publisher, the customer is really looking at content that has been formatted within pre-defined control regions on the page.

One important facet of this invention is the concept of viewing the same content objects in many different ways. As discussed above, content objects are viewed after being formatted by a particular linked control. The control knows how to format a particular piece of content by looking at the style that has been defined for that content by the designer and then comparing that style to a linked style sheet. Because each control on a page can have a different associated style sheet, different controls on the same page can each display the same linked content in varying formats. In one control, the title might be displayed using a 14 point font and bold emphasis, whereas the same piece of content in a different control on the page can be displayed in a 12 point font and italic emphasis. The ability of each control on a page to have its own associated style sheet is a powerful tool for the designer to use to format attractive content on a page.

To provide more detail on the advantages of the MP system, the following section presents an overview of the Multimedia Publishing system.

III. MULTIMEDIA PUBLISHING SYSTEM OVERVIEW

This section presents an overview of the concepts, configuration and major components of the preferred Multimedia Publication System. Beginning with a description of the important concept of separating design (or title layout) and content, this section continues by discussing the major components and configuration of the MP system. In addition, a description of the container hierarchy is discussed in conjunction with FIGS. 1–4.

The objects utilized by the MP System include a project; title; content folder and, optionally, subfolder; section and, optionally, subsection; window; page; control; style sheet; and various content objects (such as stories, images, audio, so forth). These objects will be explained in more detail below in reference to FIGS. 1–7. It is important to realize that these objects need to be stored in a nonvolatile computer memory such as a hard disk drive.

Figure 2:
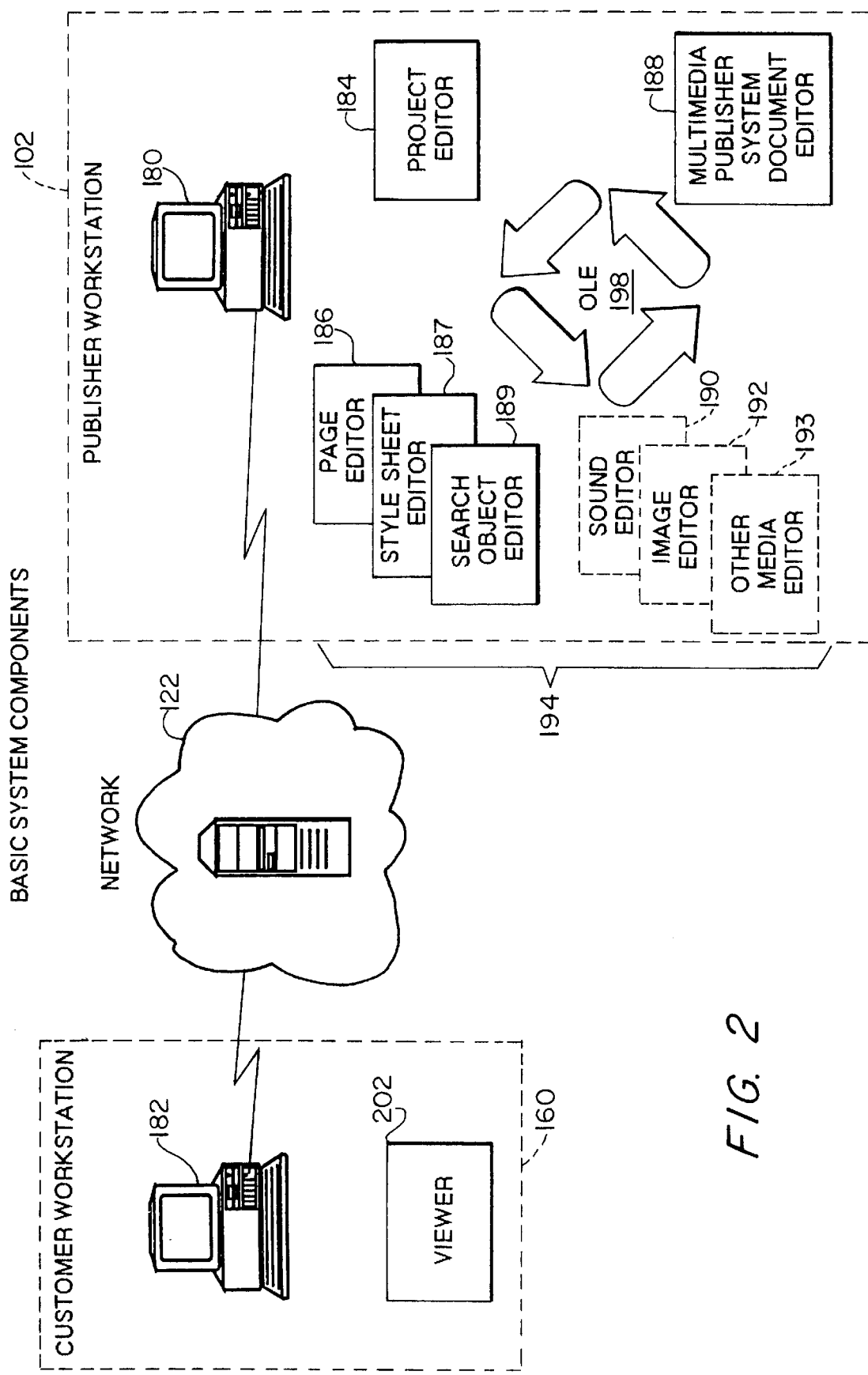
FIG. 2 is a diagram of the major system components of the MPS shown in FIG. 1.

The natural way of storing related and ordered objects is in a data structure, such as an acyclic graph. The presently preferred way of storing the MP system objects is called a caching object store (COS). In the presently preferred MPS, each title corresponds to a COS. There is least one COS at the publisher workstation and in each MPS server at the publication storage center (FIG. 2). Each customer workstation also has a COS so that the customer can store and retrieve MP system objects when assembling content into controls on pages.

A title may be broadly defined to encompass a publication (e.g., newspaper), service (e.g., stock quotations) or application (e.g., multimedia encyclopedia). When a title is viewed, the viewer opens a title file which represents the title. This title file is a COS file. Typically in the on-line scenario, this would be a skeleton title. A skeleton title is a COS file which contains only a root moniker and no actual objects. A moniker is an object used in the implementation of the COS and contains identification and status information about COS objects.

A superCOS is a COS file which contains more than one subordinate COS, known as a subCOS. For example, a superCOS at the customer workstation is used to cache objects which have been remotely retrieved from the host data center. As long as these cached objects are not out of date or flushed, the viewer will be able to quickly provide that object the next time it is requested rather than retrieving it from the data center again. This gives the MP system a tremendous speed advantage over other on-line systems.

Figure 5:
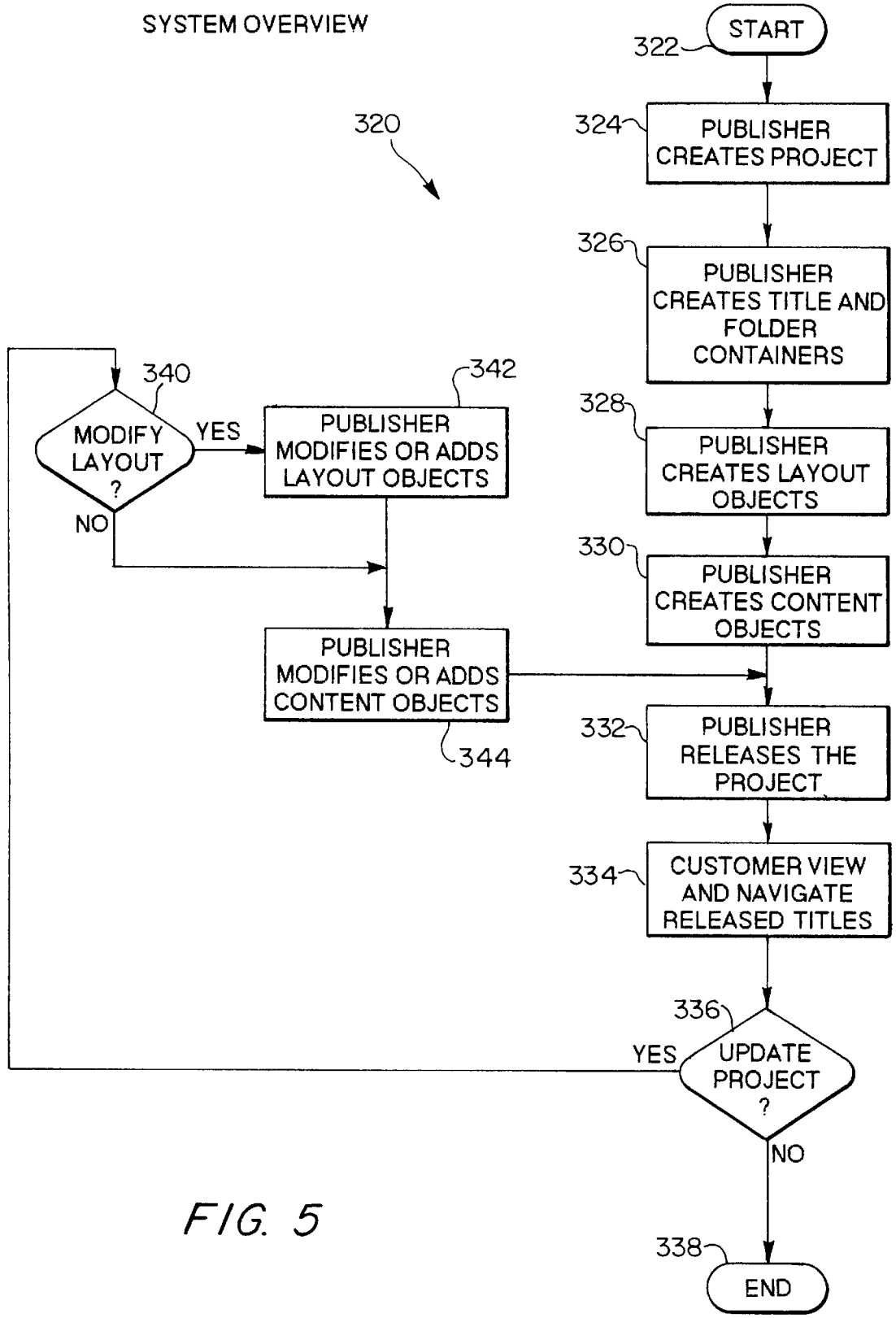
FIG. 5 is a overview flow diagram of the MPS processes performed using the system of FIGS. 1 and 2.
Figure 6:
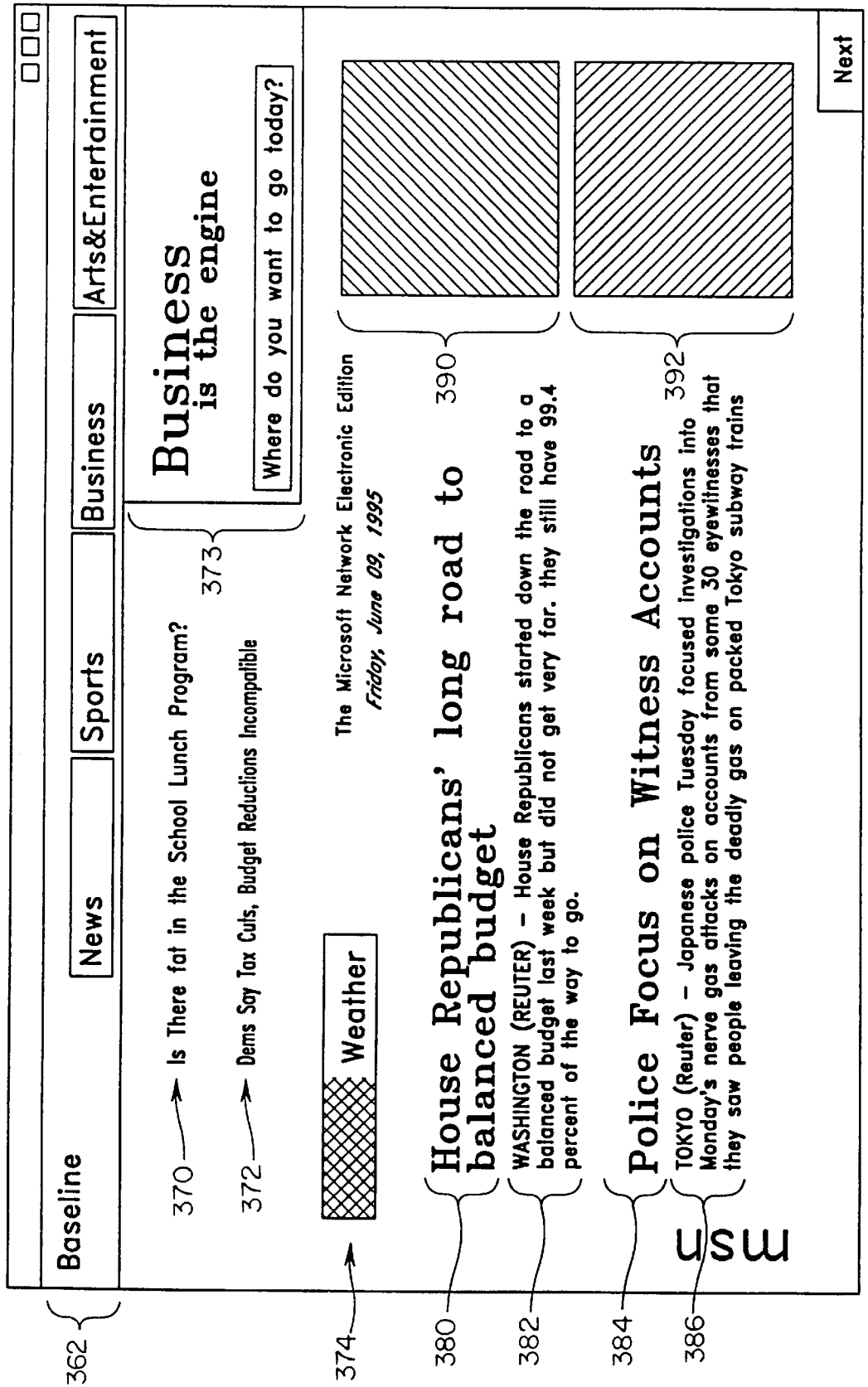
FIG. 6 is an exemplary screen display of one page of a title as displayed by the viewer of FIG. 2.
Figure 7:
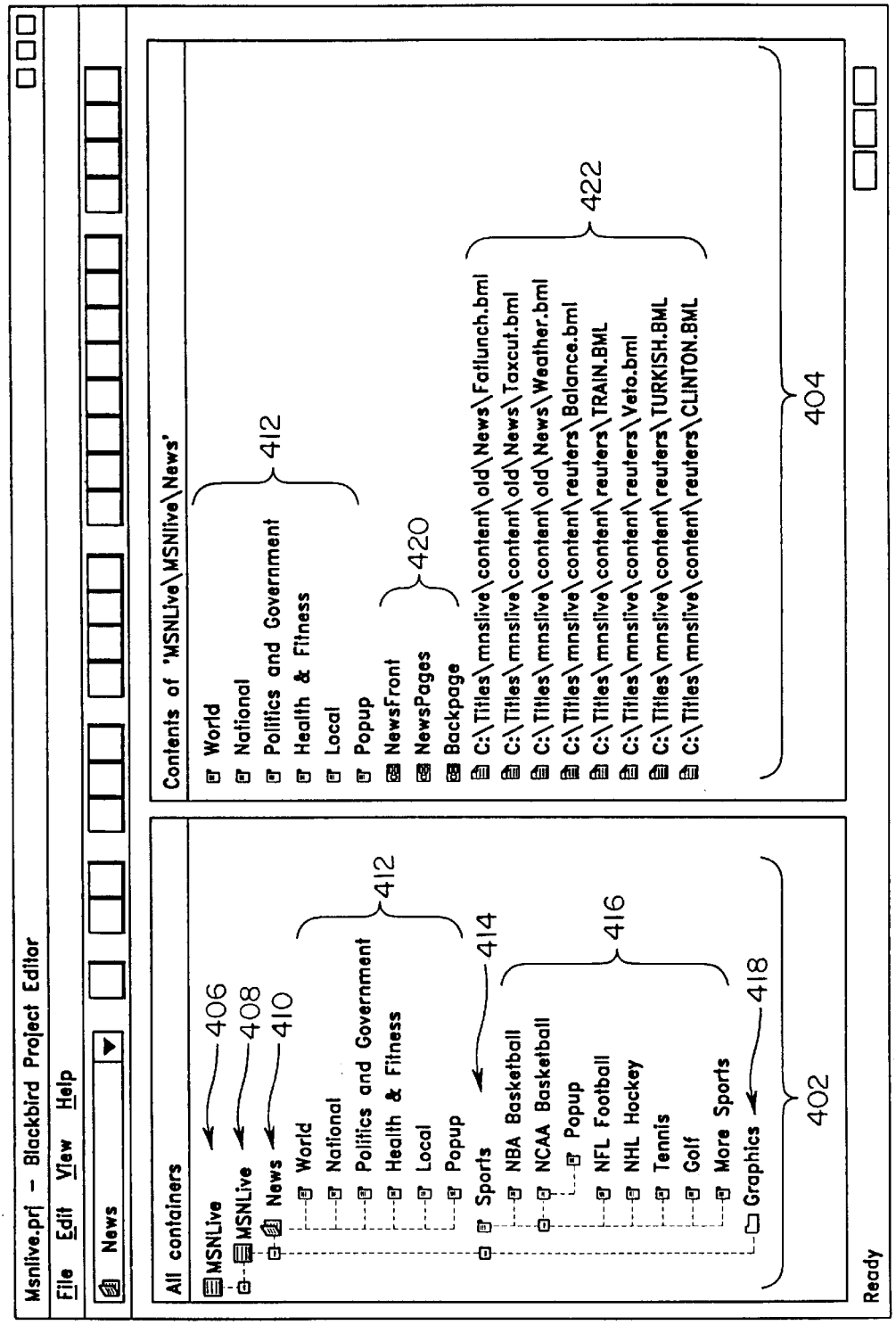
FIG. 7 is an exemplary screen display of the parts of the content and layout for the title displayed in FIG. 6.

A top level system flow diagram is presented in conjunction with FIG. 5 and exemplary Viewer screen displays that could be seen during the processes of the system flow diagram are described in conjunction with FIGS. 6 and 7. An example of the rendering process that relies on style sheets and content retrieval is presented in conjunction with FIG. 8.

A. Separation of Design and Content in the Multimedia Publishing System

As discussed above, the MPS architecture maintains a clean separation between design information and the content to which that design will be applied. A publisher's collection of page layouts is in the form of one or more titles. A title is a collection of page layouts, in a particular sequence which relates to the order in which pages will be viewed. The page layouts describe how the client area of a window will appear when a page is rendered. Rendering refers to the creation of a bitmap of a display screen in memory prior to displaying the screen. A complete page layout is created by placing controls on a blank page layout, where each control delineates an area where some piece of content should be displayed. Settings on each control determine the proper place to look for the content to be displayed in that control.

The content takes the form of discrete objects, each of which compose one unit of information, e.g., a story or a picture. These content objects are of well-known and public data formats, and may be created using any tool that supports these data formats. Content objects generally do not have formatting information encoded within them.

When the publisher has created the title (with its page layouts) and the content objects, the title and content are published together to the public distribution point. Consumers download the title and content objects to their personal computer, where the MPS viewer software uses the page layouts in the title to compose the content in the visually rich form designed by the publisher.

B. System Configuration

Referring now to FIG. 1, the basic system configuration of the multimedia publishing system (MPS) 100, which is a preferred embodiment of the system 100, will now be described. By convention, the term title is used to describe the overall plan or instructions for assembling the complete on-line MPS application on a customer's computer.

Much of the power of the MP system 100 resides in its ability to fully separate design and content, unlike existing on-line and multimedia publishing tools which require a publisher or content provider, such as a first publisher 102, a second publisher 104, or a publisher M 106 to tightly bind design and content. In the MP system, titles, such as a title A 140, title B 142, or title P 144 can be divided into two parts: the content (148, 152, 156)—the information such as bitmaps, video clips, audio, animation, or stories that make up a title—and the title layout, also termed the design (146, 150, 154)—the overall look and feel of a title. To separate content and design using MPS rather than placing content directly on a page, a publisher can place the content, such as a set of content objects 112, 114, or 118, in one or more containers of a title and then create sections or subsections having pages with special controls, such as a set of title layout objects 110 or 116, that dynamically find and display the content at runtime.

Using this technique a publisher can change a title on an ongoing basis by merely updating the content 112, 114, 116 which has been placed into various folders or containers within the master title. When a page is displayed, it shows the updated content. This is called dynamic title synthesis or dynamic synthesis, and allows content to be continually updated without any need to modify and update the title design consisting of the individual pages, controls and hand-placed content used to display the content.

When publishers use dynamic synthesis they are creating titles which contain placeholders that will be filled-in by the changing content. When dynamic synthesis is utilized, a title is used as a template and a pressing is the displayed, filled-in title. Each time the publisher updates the content in a title and makes it available for customers (also known as end-users or client end-users), such as a first customer 160, a second customer 162 or a customer N 164, the publisher is creating a new release of that title. When the customer starts to view that release, a "pressing" is made which contains part or all of the content in the release.

A major advantage of this approach is flexibility. Some parts of a title may be created by hand-placing content directly on a page, and other parts may be created using dynamic synthesis. Notice, however, that content hand-placed directly on pages is static—it changes only when the people involved in creating the title update the pages.

Returning to the creation of title layouts and content by the publisher, after creation, the title layouts 110, 116 and content 112, 114, 118 are released and stored in a publication storage 120. The storage 120 can be implemented in many forms, such as a network 122, CD-ROM 124, and other means of storage, such as bulletin boards, magnetic media, cable television and so forth.

The presently preferred network 122 is the Microsoft Network (MSN), which can be accessed, for example, by Microsoft Windows 95. Of course, the MPS is designed to be portable so that it can be used on any on-line network including but not limited to, Internet, America On-Line, Compuserve and Prodigy.

In the presently preferred embodiment of the storage 122 as the MSN, many customers will use a MSN Explorer tool to acquire and activate MPS applications.

The MSN Explorer is the integrated navigation tool within Windows 95 that is also used to browse the MSN hierarchy. Sophisticated customers may use other more advanced MPS features, such as search, scheduling, and automatic delivery, assuming these features have been activated by the publisher. Besides browsing via the Explorer or scheduling automatic home delivery, there are several additional ways customers can obtain MPS applications. For example, an individual application may be distributed via floppy disk or CD-ROM 124, it may be distributed through E-mail or bulletin boards, or the application may be directly accessible via a link in other applications (such as the Microsoft Network yellow pages system). In each of these situations, the MP system 100 acquires an application for the customer.

C. System Components

Referring now to FIG. 2, the preferred basic components of the MP system 100 will now be described. The system 100 includes a set of tools for designing, developing and viewing multimedia on-line applications. A publisher, such as the publisher 102, utilizes a publisher workstation (also known as a computer or machine) 182 and a Designer software environment 194 to create and publish the title layouts 110 and content 112. In the system 100, a publisher could possibly just create content and use the title layouts of another publisher. The title layouts and/or content are preferably stored in a network 122 that includes a high-performance server for hosting on-line applications. The preferred network 122 will be further described in conjunction with FIG. 3. A customer, such as customer 162, utilizes a customer workstation 182 and a runtime Viewer software component 202 to find and activate MPS titles, stored on the network 122, on a visual display at a workstation 182.

The Designer 194 is an extensible design and development environment that includes several preferred software components. These include a project editor 184 to manage tiles, containers, and objects; a page editor 186 to create and layout pages; a style sheet editor 187 to edit style sheets; a search object editor 189 to create search objects; a word processor, such as a MPS Document Editor 188, for creating content optimized for the MP system 100; and optional third-party tools, such as a sound editor 190, an image editor 192, and another media object editor 193 to create and modify sound, image, video, animation and other content objects. For authoring textual content, the presently preferred document editor is an enhanced version of the Microsoft Word 6.0 word processing program for creating tagged, hypertext documents. Together, these programs form the Designer Component 194.

The project editor 184 is used to invoke a style sheet editor 187 that is used to create and edit style sheets. The style sheet editor 187, and portions of the project editor 184 and page editor 186 will be described in detail in subsequent sections of this discussion.

The MPS Designer 194 is a page or forms-based development system similar to Visual Basic. The development environment is graphical and easy to use. Controls, which represent the components of a MPS application that will appear on-screen, are laid out within MPS pages. MPS pages and controls are preferably based on Object Linking and Embedding 198 (in figure) (OLE), Microsoft's component software technology that has emerged as the industry standard. OLE, which presently is at version 2, is further described in Inside *OLE* 2 and *OLE* 2, *Programmer's Reference*, Volumes 1 and 2, all of which are published by Microsoft Press. In addition, the System Overview chapter of *Class Library User's Guide for the MFC Class Library*, Microsoft Corp., 1993, provides further relevant information. However, other compound document architectures such as OpenDoc could be used as well.

A major feature of OLE is interoperability, the basis for integration between applications. This integration brings with it the need to have multiple applications write information to the same file on the underlying file system. OLE defines a model called OLE Structured Storage for treating a single file system entity as a structured collection of two types of objects; storages and streams. These objects act like directories and files, respectively.

The OLE Structured Storage model generally implements these objects; applications rarely, if ever, need to implement them. These objects, like all others in OLE, implement interfaces: IStream for stream objects, IStorage for storage objects.

A stream object is the conceptual equivalent of a single disk file. Streams are the basic file system component in which data lives; each stream has access rights and a single seek pointer. Through its IStream interface, a stream can be told to read, write, seek, and perform a few other operations on its underlying data. Streams are named by using a text string; they can contain any internal structure because they are simply a flat stream of bytes. In addition, the functions in the IStream interface map nearly one-to-one with standard file-handle-based functions such as those in the ANSI C/C++ run-time library.

A storage object is the conceptual equivalent of a directory. Each storage, like a directory, can contain any number of substorages (subdirectories) and any number of streams (files). Furthermore, each storage has its own access rights. The IStorage interface describes the capabilities of a storage object, such as enumerate elements (dir), move, copy, rename, create, and destroy. A storage object itself cannot store application-defined data except that it implicitly stores the names of the elements (storages and streams) contained within it.

The OLE Structured Storage technology solves problems associated with previous flat file systems through the extra level of indirection of a file system within a file. With OLE, a particular application can create a structured hierarchy where the root file itself has many substorages. Each substorage can have substorages within it, and so on.

This structure solves the problem of expanding information in one of the objects: The object itself expands the streams in its control, and the implementation of storage determines where to store all the information in the stream.

The MP system 100 includes a number of pre-packaged controls such as navigation controls, rich-text controls, multimedia controls, and other special controls specifically designed to support the creation of MPS applications. Because MPS is based on OLE, third parties can also design their own controls for use within MPS (using the Microsoft OLE Control Development Kit that is bundled with Microsoft Visual C++ 2.0). In this way, the MPS development environment is fully extensible so that customers can add new capabilities to their MPS applications by purchasing additional controls from third parties or by creating their own controls. The MPS development environment also includes a Visual Basic for Applications (VBA) scripting and debugging system.

While content is displayed within controls that have been laid out on MPS pages in the MPS Designer 194, content can be authored in any number of existing Microsoft and third-party tools. One such tool for authoring hypertext is the MPS Document Editor 188 that supports special MPS features for creating and tagging MPS text. Other existing tools for creating bitmaps, complex drawings, and other multimedia content can be used to create the content displayed within any particular OLE Control. In addition, most existing OLE Controls (.ocx executable programs) will work in the MPS environment although they may not be optimized for on-line applications. For example, a standard AVI OLE Control could be placed in an MPS application.

The controls that are part of the MP system 100 are optimized for low bandwidth on-line delivery of data. However, the use of high bandwidth data delivery is within the scope of the present invention. The MPS 100 is designed to operate with information that can change from minute to minute, daily, or monthly. So while MPS can be used for creating static titles that are hand-crafted and cannot be easily updated on an ongoing basis, the main focus of the MP system 100 is to provide an efficient, cost-effective mechanism to manage the creation and management of dynamic, continually changing on-line applications. At the same time, as an open development environment, many of the tools commonly used for creating static multimedia content can easily be incorporated into the MP system 100.

When activated by the customer, the Viewer 202 examines the components of a selected title to see if any of the information required to display the pressed title needs to be acquired. It then acquires this information and organizes it so that it can be displayed to the customer 162. Thus a pressed title captures the set of information that is displayed to the customer at a given point in time. In other words, some titles might produce a new pressing every day as the content changes. On the other hand, other titles may be static; when a static title is activated there is no need to do another pressing.

While pressing a static title may seem unnecessary, the process of organizing and displaying the pressing can take into account customer preferences and display device characteristics. For example, suppose a customer activates a static title on a laptop when using the laptop screen and then later activates the same title when the computer is attached to a larger display. The second activation may result in another pressing to take into account the much larger screen area. When the title is activated, the MPS Viewer 202 determines if the title is out of date; acquires any needed information; and then, if necessary, creates and possibly personalizes the pressing.

The MPS Viewer 202 enables customers to perform the following actions within the limits defined by content providers: select and personalize the information a title acquires, modify the overall structural properties of titles, personalize the look and feel of titles, manage and archive the content customers acquire, and view billing and pricing information.

The requirement for the preferred publisher workstation 180 is a Windows 95 workstation with the minimum hardware configuration necessary to run the MSN sysop tools and to store and display the titles under development. The preferred Windows 95 workstation has, at a minimum, an Intel 486 processor running at 33 MHz or better with eight Megabytes of memory. A 9600 baud or faster modem is required to run the MSN sysop tools. For multimedia titles, this includes a MPC2 compliant (multimedia configured) workstation.

The MPS Viewer 202 should be installed on the customer workstation 182 before an MPS title is activated. The presently preferred customer workstation is capable of running Windows 95. To make this installation easy, the Viewer 202 is automatically installed onto the customer workstation 182 the first time the customer connects to MSN and the MP system 100 is enabled. MPS titles may include resources such as fonts, Dynamic Link Libraries (DLLs), and OLE controls that are placed into the resource container or folder of MPS titles. Before customers can view such titles, these resources are installed on their workstation 182.

D. Network Storage

Figure 3:
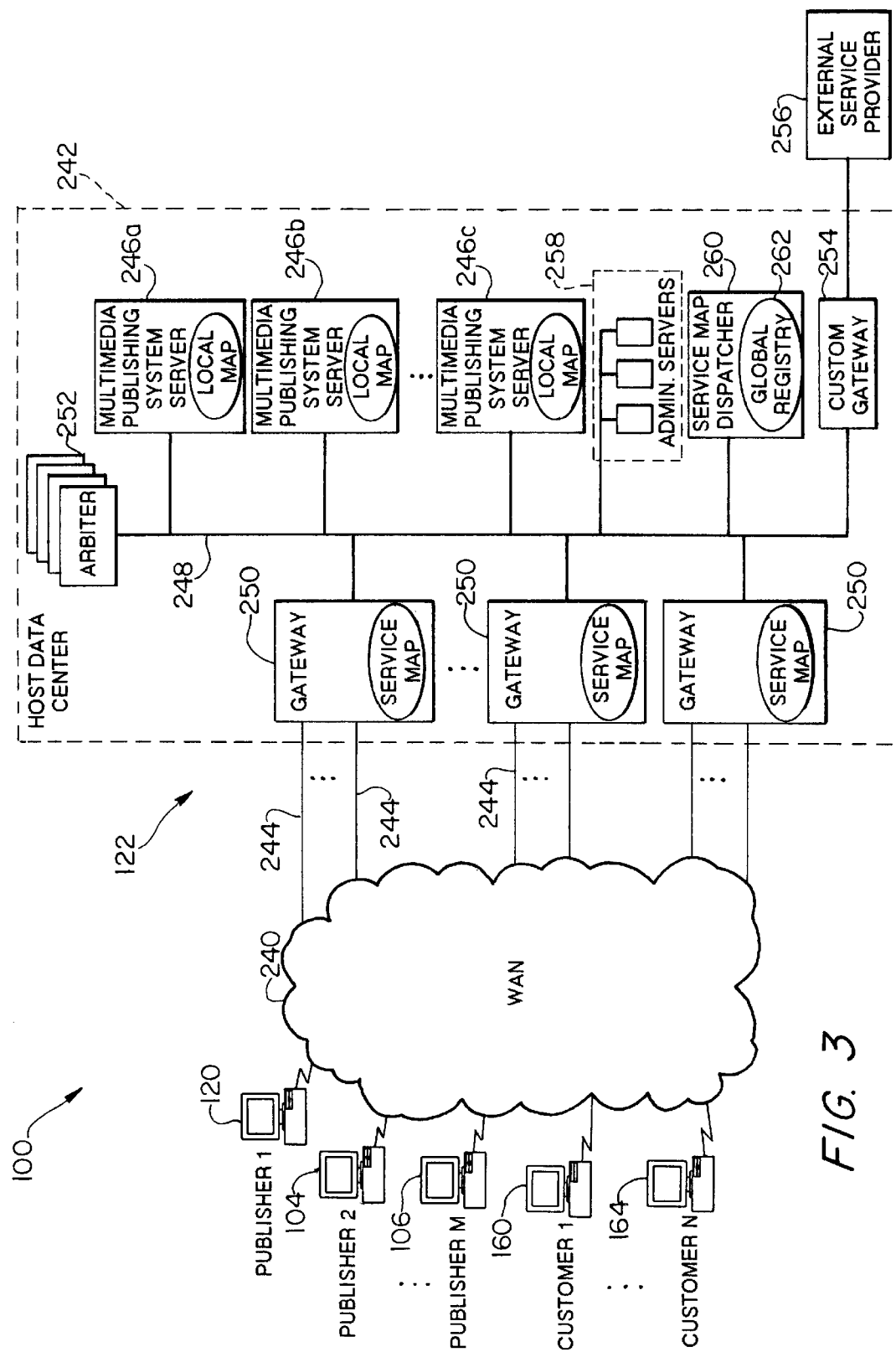
FIG. 3 is a diagram of a exemplary network storage subsystem, which is an implementation of the publication storage shown in FIG. 1.

Referring to FIG. 3, an exemplary network storage subsystem 122 will be described. FIG. 3 is a high level diagram illustrating the basic components of an on-line network 122 in accordance with one embodiment of the invention. Multiple publisher workstations 102, 104, 106 and customer workstations 160, 164 are connected to a host data center 242 by a wide area network (WAN) 240. The wide area network 240 includes WAN lines 244 which are provided by one or more telecommunications providers, and which allow end users (i.e., publishers and customers) over a wide geographic area to access the host data center 242 via modem. The WAN lines 244 preferably include both X.25 lines and ISDN (Integrated Service Digital Network) lines.

The host data center 242 comprises a plurality of application servers 246 connected to a high speed local area network (LAN) 248 (which may include multiple LANs). Each application server 246 has a unique server ID. As shown in FIG. 3, three of the servers 246 are MP System servers (246*a*, 246*b* and 246*c*). Also connected to the LAN 248 are multiple Gateway computers 250 also referred to as Gateways, which link incoming calls from end users to the application servers 246.

It is envisioned that the host data center 242 may advantageously have on the order of one hundred Gateways 250, and between several hundred to several thousand application servers 246. A host data center of this type will be able to handle tens of thousands of simultaneous user logon sessions.

As described below, the server side of each on-line service is preferably implemented using one of the following: (1) a single application server 246, (2) a set of "replicated" application servers (i.e., application servers which run the same service application or applications) that provide access to replicated (and locally-stored) copies of service "content" data (i.e., data provided to end user's of the service), or (3) a set of replicated application servers that provide access to server-specific (non-replicated) service content data.

The host data center 104 also includes multiple Arbiter computers 252 that monitor, record and process certain types of transactions to ensure consistency among replicated application servers. The host data center 104 also includes one or more custom Gateway computers 254 which link the host data center 104 to one or more external service providers 256, such as a credit card service that validates and executes credit card transactions.

The host data center 104 also includes a number of administrative servers 258. The administrative servers 258 perform administrative functions such as accounting, billing, network management, backup, system security, performance analysis, and server-to-service allocation.

To route user service requests to the appropriate servers 246, the Gateways 250 must have some way of determining the unique IDs of the servers that are currently handling the requested services. This is accomplished by means of a service map (not shown), which contains information about every service and server 246 in the host data center 242.

The service map is preferably generated by a service map dispatcher 260, which may be implemented on a single computer.

In addition to generating a service map, the service map dispatcher 260 maintains a central repository of information referred to as the "global registry" 262. The global registry 262 contains various information about the present configuration of the host data center 242. For example, for each service group, the global registry 262 indicates the IDs of the servers 246 of a service group, and the identity of the Arbiter computer 252 (if any) which is assigned to the service group.

Further disclosure of the preferred network 122 is provided in a copending application also assigned to the assignee of the present application, Microsoft Corporation, entitled "System For On-Line Service In Which Gateway Computer Uses Service Map Which Includes Loading Conditions Of Servers Broadcasted By Application Servers For Load Balancing", Ser. No. 08/472,807, filed Jun. 7, 1995, now U.S. Pat. No. 5,774,668.

E. Container Hierarchy

Figure 4:
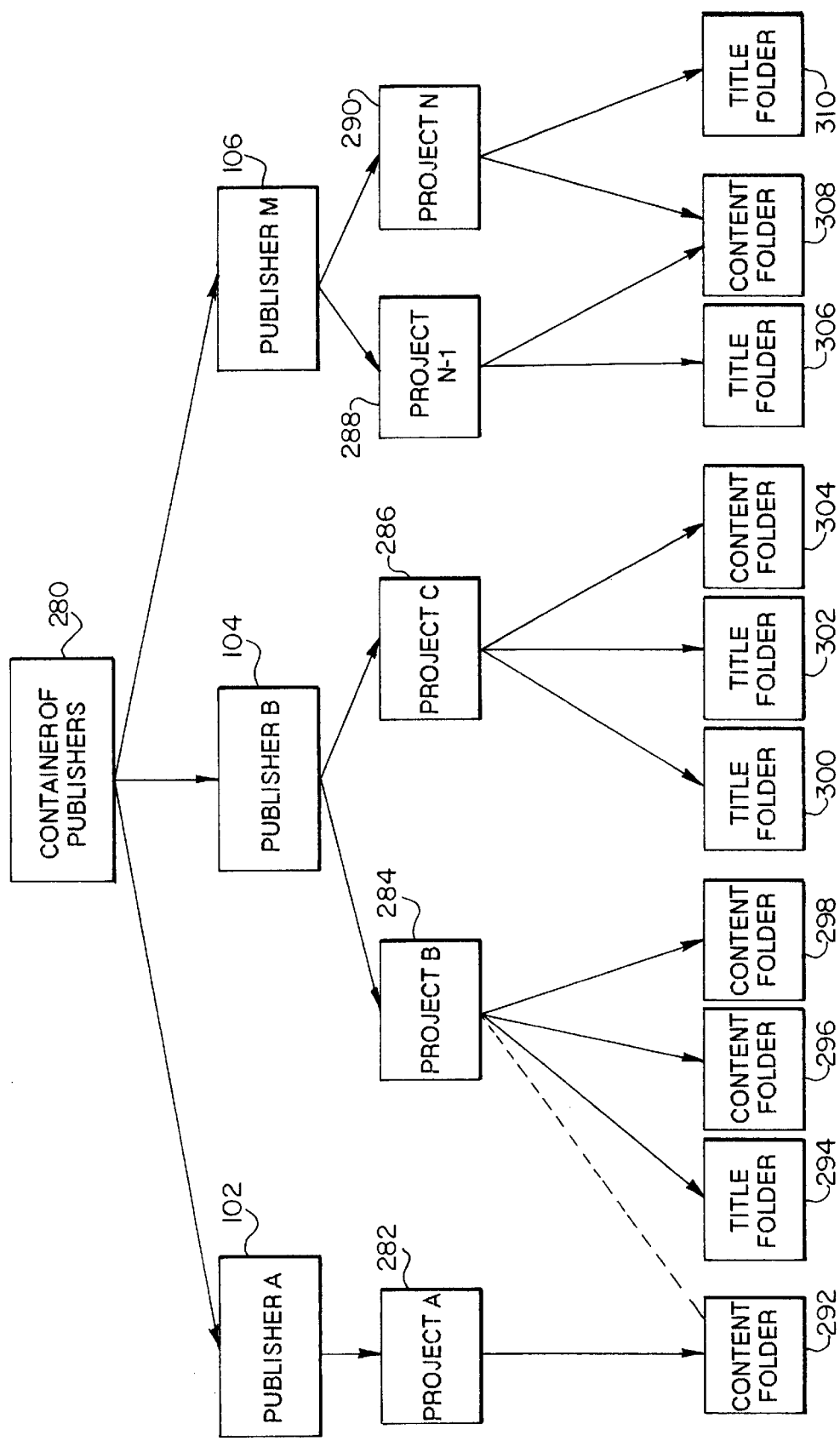
FIG. 4 is block diagram of a hierarchy of containers for a plurality of publishers using the system of FIGS. 1 and 2.

Referring now to FIG. 4, the high level hierarchy of containers for a plurality of publishers using the MP system 100 will be described. In the presently preferred embodiment, the MP system 100 depends on the existence of a specific directory structure with the MSN directory tree. This structure is rooted at a specific folder (specified via the MSN global registry 262) known as a container of publishers 280. Every publisher 102, 104, 106 will have at least one container or folder called a project. For example, the publisher 102 has a folder called Project A 282, the publisher 104 has two folders called Project B 284 and Project C 286, and the publisher 106 has two folders called Project N-1 288 and Project N 290. Content folders and/or titles are dropped into the folder of the publisher.

Allowing for multiple projects satisfies the needs of a large publisher. For instance, a project could be assigned to one magazine (e.g., gardening) and another project could be assigned to another magazine (e.g., motorcycling). Thus, each month's issue could be archived as a title according to volume and number in its respective project.

As an example of how projects could be configured, Project A 282 only has a content folder 292; Project B has a title folder 294, and two content folders 296 and 298, along with a link to the content folder 292 of publisher A 102; Project C has two title folders 300 and 302 that could share a content folder 304; Project N-1 has a title folder 306 and a content folder 308; and Project N has a title folder 310 and shares content folder 308 with Project N-1. Publisher 102, for example, could be a provider of raw statistics in content folder 292 but does not want to generate title layouts. The publisher 102 may have an agreement with the publisher 104 for the publisher 104 to allow access and use of the content in the content folder 292. The publisher 106 has two projects 288 and 290 that share the content folder 308, for example, due to the common subject matter of titles in title folders 306 and 310. As illustrated in FIG. 4, a project, such as the project 286, may contain multiple titles folders.

F. Top Level Flow Diagram

Referring now to FIG. 5, a top level flow diagram of the processes performed using the MP system 100 will now be described. The flow diagram and this description introduce the process 320 a publisher 102 or information content provider (ICP) would use to design and distribute MPS titles.

As previously stated, a title is a publication, application, or service created using the MP system 100. A title consolidates the set of instructions for assembling the information that is displayed to the customer 160. Customers see titles as icons on the Microsoft Network, on CD-ROMs, or in a file system. By double-clicking (activating) on the title, name or icon, the customer can interact with the title.

1. People and Tasks involved in Title Creation

The MP system 100 is designed to support large teams creating complex on-line applications, as well as small teams creating individual works (and anywhere in between). This section, however, discusses only the more complex, high-end operations. In simpler scenarios, one person could perform more than one of the roles described below, and the amount of materials (stories, artwork, advertisements, and so on) would be more limited than the materials described here.

The process of creating and publishing a MPS title can be broken into a title-design phase and a release-creation phase. The process is set up so that all of the content and layout that is common across releases can be performed once in the preparatory design phase, and then left alone. This allows for a smaller team and faster turnaround in producing each release.

a. Title Design

The process of creating a new title begins with the editor. Assisted by business development staff, the editor decides on a target customer base, and on a concept for the title that will appeal to that base. This design team then develops that concept into a proposed organization for the contents of the title.

Before content can be put in place, a framework for the title must be created. This involves:

Creating a section hierarchy within the title.

Creating content folders to store stories, advertisements, and other pieces of content.

Creating search objects in each section of the title that draw content from the appropriate content folders using specified criteria. In some organizations, this work will be done by the editorial staff. In others, it may be done by the production staff.

Once the basic framework is in place, the art department can create artwork to fill in the title's common elements. This includes:

A style sheet describing font usage and text layout.

Page layouts for sections that dynamically gather their content.

Page layouts for sections that are always the same (cover, title pages, mastheads, and so on)

Logos.

Optionally, organizations may want to include developers in the title design process. For example, the particular application being designed may benefit from the use of custom designed OLE Controls. These controls could be purchased, or developed in-house using the Microsoft Visual C++ development system. Additionally, the advanced features of the Blackbird system, including accessing the API or scripting controls to respond to events or automatically perform actions at runtime would require some development work, either in the high level scripting language (VBA), or in a lower-level language such as C++.

b. Authoring and Title Release

Once the framework is created, the staff can now turn their attention to creating individual releases. All of the work done in the conceptual phase above is potentially re-usable for every release. In fact, for a title with little need for detailed artwork, the rest of this process could merely be a matter of dropping edited content (including advertisements) into content folders.

For dynamic titles, most (and potentially all) of the work is done within the Content Authoring environment. For static titles, it could all be done within the Title Design environment. In practice, most releases will involve some work in both of these environments.

i) Writers Provide Tagged Content

Content authors—including editors, writers, reporters, and forum managers—generate content, including structured stories, using the content authoring environment. Writers compose the textual content that appears in a title (or a release of a title). They hand their materials off to the editorial staff. The editorial staff is in charge of the overall content of the title. For multimedia titles, this role is very similar to the director of a motion picture or television program.

The content authoring environment supports a variety of tools, such as, for example, a MPS document editor. The MP system 100 also supplies tools to specify and manage links and to specify story properties. Third-party tools may also be added to the content authoring environment.

From a content author's perspective, creating structured stories can be as simple as typing them in the MPS document editor and applying certain styles. More sophisticated content can be created though a variety of means, such as including links to graphics or placing special properties on a story.

For content providers that do not want to expend much effort creating tagged content, the MP system 100 includes MPS document editor templates that handle most of the tagging for the author.

ii) Editorial Staff Chooses Content

Once the editorial staff has chosen the stories they wish to include in a release and are satisfied with the content of those stories, they pass them on to the art department to select and insert appropriate artwork, and to the production staff to place in content folders.

iii) Art Department Supplies Specific Art

The artistic staff is responsible for designing the more graphical aspects of the title. In the early conceptual phase, graphic artists work with the editor to design a distinctive look and layout. This includes font styles, colors, titles, logos, and page layout templates. The term "art department" is used in the broadest sense here. In the multimedia world, the role of an art department goes beyond traditional print-based artwork.

The art department in many cases inserts the artwork into the stories and tags that artwork so that it will presented appropriately (placed inline in the story text, as a wrap, or as a pop-up). They then pass the stories on to the production staff to be placed in content folders. In the case of static titles, the art department designs new pages and gives them to the production staff to be placed in the title framework.

iv) Advertising Department Supplies Copy

The advertising sales staff sells advertising space in each release. The advertising sales department collects copy from advertisers who have bought space in the release, and delivers the copy to the production staff to be placed in content folders.

v) Production Department Does "Paste-up", Proofing and Release

The production staff does the fundamental tasks, such as paste-up, necessary to put a title or release together. Once the production staff has everything that goes into the release, they "paste up" the release by placing everything in its appropriate place and performing a "test-pressing" to make sure that nothing is missing. The editors, art staff, production staff, and advertising staff review the test-pressing to make sure that everything looks and works correctly. Once everyone is satisfied, the production staff places everything on the publisher's server and releases it to be copied to additional servers at the Microsoft Network data center.

2. Top Level Flow

The process 320 begins at a start state 322 and continues at a state 324 wherein the publisher 102 uses the MPS project editor 184 (FIG. 2) to create a project on their workstation 180. A project, such as project C 286 (FIG. 4) contains all the information needed to build and distribute one or more titles and any associated content.

Moving to state 326, within the project, the publisher 102 creates titles and content folders, such as title 300 and content folder 302 (FIG. 4). A title consists of nested sections that contain MPS objects such as pages or search objects. Folders typically contain MPS content objects such as stories or pictures. To make the process of managing titles, folders, and MPS objects easy to understand and use, the preferred MPS 184 project editor (FIG. 2) looks and works like the Windows 95 Explorer.

Proceeding to state 328, the publisher 102 uses the MPS project editor 184, page editor 186, style sheet editor 187, and search object editor 189 (FIG. 2) to create the MPS layout objects such as pages, styles, and search objects. The page editor 186 is also used to place controls (each control is a program responsible for handling a displayable region) on a page.

Moving to state 330, the publisher 102 creates content objects using the MPS Document Editor 188, or the publisher can use third-party tools, such as the sound editor 190 or the image editor 192, that produce formats that the MP system 100 can interpret. The authoring and processing of content objects is further disclosed in a copending application also assigned to Microsoft Corporation, entitled "Structured Documents in a Publishing System", Ser. No. 08/503,307, filed concurrently with this application.

The creation of content objects could also be done prior to any of states 324, 326, or 328. After the content objects are created at state 330, the publisher invokes the page editor 186. If not previously done at state 328, the publisher lays out each page with at least one control. Selecting a control on a page lets the publisher bring up a context menu, of which one item is a Properties selection. Choosing the Properties selection brings up a control's property sheet. Among the property sheet pages are a story page and a picture page. The story page allows the publisher to choose a story content object that is to be displayed in a story control. The publisher could enter a path name to the desired content object. Alternatively, pressing a ". . . " button brings up a Content Browser dialog which allows for browsing within the project to find a desired story content object. The picture page is used for choosing a picture object to display in a control. The publisher could enter a path name to the desired content object. Alternatively, a Content Browser dialog allows the publisher to choose a picture content object from within the project. Other types of content objects are associated with a layout object in a similar way. Further descriptions of the property sheet pages are provided below in conjunction with a discussion of controls.

Proceeding to state 332, the publisher 102 releases the project. In the presently preferred embodiment, releasing a project makes the titles, stories, and other MPS objects available on the Microsoft Network 122. The MP system 100 automatically connects to the network 122 and makes the titles in the project available to the customers 160, 162, and 164 (FIG. 1). Alternatively, the MP system 100 can release the title to CD-ROM 124 or other storage/communications media.

Continuing at state 334, the customer 160 uses the MPS Viewer 202 (FIG. 2) to read and page through (also termed navigation in an electronic publication) the released titles. As parts of the title are accessed, they are cached on the customer's computer 182 for fast access. The viewer 202 organizes and composes the objects it has collected and displays them to the customer 160.

Over time, the publisher 102 can update the project and the MP System automatically tracks the changes. Decision state 336 determines if the publisher desires to update the project. If the publisher does not wish to update the project, process 320 completes at end state 338. However, if decision state 336 is true, that is, the publisher desires to update the project, the process 320 moves to a decision state 340 to determine if the publisher 102 desires to modify the layout in the project. If so, the process 320 moves to state 342 wherein the publisher modifies one or more existing layout objects or adds one or more new layout objects. If the decision state 340 evaluates to be false, or at the completion of state 342, the process 320 moves to state 344 wherein the publisher modifies or adds one or more content objects. At the completion of state 344, process 320 proceeds to state 332 wherein the project is released again. Releasing the updated project ensures that the proper set of layout and content objects are made available to the customer 160 (FIGS. 1 and 2).

G. Exemplary Screen Display of Title

Referring now to FIG. 6, an exemplary screen display 360 of a page of a title as displayed by the Viewer 202 on the visual display at the customer workstation 182 (FIG. 2) will now be described. The screen display 360 corresponds to a World News section of a MSNLive title using a NewsFront page layout. A tabbed horizontal bar 362 near the top of the screen 360 is a result of a caption button control showing the major sections of the title. By selecting a section name (by use of a pointer device like a mouse, not shown, but which is a part of or connected to the workstation 182), the customer 102 can navigate directly, through a link, to the selected section.

Below the bar 362 of screen 360 are two headlines 370 and 372 which are the result of an outline control that can be used as links to corresponding stories on another screen of the title. Block 373 in this example contains an advertisement resulting from a picture control. Block 374 contains a graphic and text resulting from a picture button control that provides a link to a weather screen. Areas 380 and 384 display headlines for corresponding abstracts 382 and 386, respectively, and are the result of an outline control. By selecting the headline 380 or 384, the customer can navigate to the body of the corresponding story on another page of the title. Areas 390 and 392 display picture objects corresponding to the headlines 380 and 384, respectively, and are the result of picture controls.

The objects and placement of the objects on the displayed page 360 are determined by the publisher 102. Of course, other objects or placements of objects could be utilized by the publisher 102.

H. Exemplary Screen Display of Project Editor Window

Referring now to FIG. 7, an exemplary screen display 400 of the parts of the content and layout for the example title displayed in FIG. 6 will be described. The Project Editor window 400 is the main interface for the Designer 194 (FIG. 2). The window 400 is intended to closely mimic the Microsoft Windows 95 Explorer. Using this window 400, the publisher can open, edit and save a project, as well as release the contents of that project to the MSN Data Center 242 (FIG. 3). An approximately left one-third of screen 400 is a display area 402, also known as a left pane, that shows the hierarchy of containers of one project for a publisher and allows the user to navigate through it. The left pane shows only containers (folders, titles, and sections). An approximately right two-thirds of the window 400 is a right pane 404 that shows the contents of a container selected in the area 402 by the user of the project editor 184 (FIG. 2).

Referring to the left pane 402 of the window 400, the top level of the hierarchy of containers is the project "MSN-Live" 406. Just below the project is the title "MSNLive" 408, which in this example has the same name as the project 406. Below the title in the example hierarchy are two sections: "News" 410 and "Sports" 414. Also at this level in the hierarchy is a content folder 418 labelled "Graphics", which holds the picture objects used by the project 406. Below the sections 410 and 414 is a set of subsections 412 for the "News" section 410 and a set of subsections 416 for the "Sports" section 414. The "News" section container 410 has been selected by the user, which is evidenced by the highlighting of the section label "News" and the opened section icon to the immediate left of the "News" label.

Referring to the right pane 404, the layout objects and content objects directly contained within the selected container in the left pane 402 are shown, e.g., the objects of the "News" section container are displayed in this example. The left pane 404 uses standard Explorer views, as well as a special view built for the window 400, which sorts according to a user-defined order and allows the user to change the order by dragging and dropping each objects' icon. The objects are preferably grouped by type of object, such as, for example, subsection objects 412, page layouts 420 and content objects 422. The order of the pages and content objects is significant. The title maintains a sequence ordering of the sections, pages, and search objects, as this is important in determining how the title is displayed. Within a section, the pages have a sequence that determines the order in which they are used to press content and the order in which they are displayed when the user browses sequentially. In a static section, pages are displayed in the order shown in the project editor window 400.

A dynamic section uses the dynamic story control (FIG. 8) to display stories within a section. The stories are sorted according to rules specified on the section's property sheet and then are concatenated or linked together. The stories are then filled into the dynamic story controls on each page in the section, in the order in which the pages are arranged in the section. If there are more stories than there are pages, the last page is re-used repeatedly until all content has been pressed. For instance, in FIG. 7, the Backpage in pages 420 would be reused.

Toolbar buttons and corresponding menu commands allow the user to quickly add new objects to the titles and folders within the project 406. Clicking a button will add a corresponding object to the container selected in the left pane 402. Only those objects that are allowed to be in the selected container have their corresponding toolbar buttons and menu items enabled.

I. Example of Rendering Process

Referring now to FIG. 8, the interaction of page layouts, having controls, and objects at the Viewer 202 (FIG. 2) to render pages will now be described. The Viewer 202 supports the display of information through windows. The placement, organization, and number of windows is under the control of the publisher 102. Viewer windows are Windows 95 frame windows. These windows are completely under the control of the designer. The designer controls the Viewer 202 by creating a title. The title sets the size and standard elements (title bar, Min/Max buttons, caption, border, menu bar) of the various windows displayed by the Viewer 202.

The entire client area of a viewer window is used to display a series of pages. Each page contains a set of controls that are used to display content, to navigate through the title, and to gather information from the customer. In response to customers actions or other events, the page that is displayed may change during the course of running the title. This behavior is determined by the publisher 102. A title may have more than one window visible at any given time, and popup windows may be modal or modeless. Only one title may be displayed within a Viewer window at any given time.

FIG. 8 presents a diagram of a front page section 430 and a business section 432 for a title, such as a newspaper.

1. The Front Page Section

The front page section 430 contains a page 434 which has a picture control 436, a set of static story controls: a first story control 438, and a second story control 442. Each static story control or picture control is linked at publication time to just one object. Each of the picture and story controls on the page 434 references a style sheet 443 to provide formatting instructions on how the content is to be displayed.

An outline control 440 is also shown on the page 434. The outline control 440 is one presently preferred implementation of the information map invention. The outline control 440 displays navigation links in an outline structure corresponding to the organization of the title or any section with the title. The structure may be indented but this is entirely optional according to the designer.

As shown in FIG. 8, a picture object 460 is linked to the picture control 436, so that upon rendering, the picture object 460 is displayed on the page 434 at a position determined by the control 436. Similarly, a story object 462 is linked to the static story control 438 and rendered into the position of the control 438 on the page 434.

Note that since the control 438 is a static story control, any area not used by the story object 462 in the area identified by the control will be blank. The designer can also choose to only display a portion of a linked story within a static story control by adjusting or sizing the control to only hold one paragraph, or other desired portion, of the story content. Normally, a static story control will allow scrolling of a story so that ultimately the entire story will be displayed.

Finally, a story object 466 is linked to the story control 442 so that it is rendered in the area identified by the static story control 442 on page 434. In this example, the entire story object 466 is rendered onto page 434.

It is important to note that each of these story objects makes reference to the style sheet 443 before being rendered on the page 434. When story objects are authored, they are given formatting tags that represent specific styles. As the story objects are rendered, they reference the style sheet that is linked to the appropriate control to retrieve formatting information. This formatting information includes properties of the paragraphs, fonts and embedded objects in the story that format the content as it was originally designed. Due to the separation of design and content in the MP system, the story objects themselves only have formatting tags, but do not contain a description of the particular format that corresponds to each tag. The descriptions of those tags is found in the style sheet that is linked to the control into which the story object becomes rendered. This process will be explained in more detail below with respect to FIGS. 9–15.

2. The Business Section

As also shown in FIG. 8, the business section 432 contains a first page 444 and a second page 446. The page 444 has a single static story control 448, a single picture control 450, and a first dynamic story control 452. The second page 446 has two dynamic story controls, 454 and 456. In addition, a style sheet X 457 and a style sheet Y 459 are referenced by the different controls on pages 444 and 446. The pages in the business section 432 differ from the page 434 in the front page section 430 because they rely on a search object 468 to retrieve particular stories. On the page 434, the static controls were each linked to a particular story which was then displayed upon rendering. The search object 468 is affiliated with the dynamic story controls in the section 432.

As shown in this example, the static story control 448 and the picture control 450 on the page 444 reference the story object 464 and the picture object 460, respectively, and display these objects as shown on the rendered page 444. The story object 464 is thereby shared between different sections, pages and controls in the title. The entire story object 464 is displayed on the page 444, whereas only the first paragraph was displayed on the page 434. By using a similar process, a designer can choose to display just the first paragraph of a story on the first page of a title, but include the entire story on another page within the same title. As shown in FIG. 8, the picture object 460 is also shared between the control 436 and the control 450. This sharing of content between separate sections and pages is an important feature of the MP system 100.

3. Dynamic Story Controls

The dynamic story control 452 uses the results of a query performed by the title to retrieve stories matching search criteria set by the publisher (as defined by the search object 468). The search object 468 locates story objects having specific properties. In the example of FIG. 8, the search object 468 returned many story objects 470, 472 and 474 corresponding to story objects 1 through N, respectively (where N=4 in this example). All of the retrieved story objects are concatenated together by the dynamic story controls and poured into the appropriate regions on the pages. The order that the stories become rendered into the control regions starts with the first dynamic story control on the page in the section and continues to other dynamic story controls contained within the section.

If enough pages to display all the located stories are not defined in the section, the last page used is repeated until all stories are rendered. Thus, the first located story 470 is poured into the area defined by the dynamic story control 452. Since it does not completely fit in that area, the located story 470 continues across the page boundary onto page 446 into the area defined by the dynamic story control 454. The located story object 472 then begins after the located story object 1 470 ends. The next located story object (located story object 3) begins after the story object 472 ends, continuing into the next control 456 on page 446, as shown in this example. The last located story object 474 retrieved by the search object 468 in this example is then rendered into the dynamic story control 456 within page 446.

As explained above, the dynamic story controls in the section 432 use the search object 468 to display the results of queries made for specific information. For example, the search object 468 may return content that contains the word "Microsoft". Each of the stories found by the search object 468 will be displayed in the areas defined by the dynamic story controls in the format designated by the style sheet 457 or the style sheet 459.

For example, if the dynamic story control 454 is linked to the style sheet 457, then all of the stories displayed by the dynamic story control 454 will appear in the format designated by the style sheet 457. However, the stories rendered by the dynamic story control 456, when this story control is linked to a different style sheet (for example, the style sheet 459), would appear differently than the formatted display corresponding to the dynamic story control 454. In this example, if the controls 454 and 456 use different style sheets, the located story 3 would be displayed using two formats when the transition from the area defined by the control 454 to the control 456 was made. This demonstrates the power of using separate style sheets for controlling the display format of particular stories.

IV. INFORMATION MAP OVERVIEW

This section provides an overview of the information map embodied as an outline control on the MPS. The outline control recognizes the structure of a title layout and organizes the title layout in the form of an outline as presented to the customer. In addition, the individual story headings created by the designer may be selectively included in the outline.

Figure 9B:
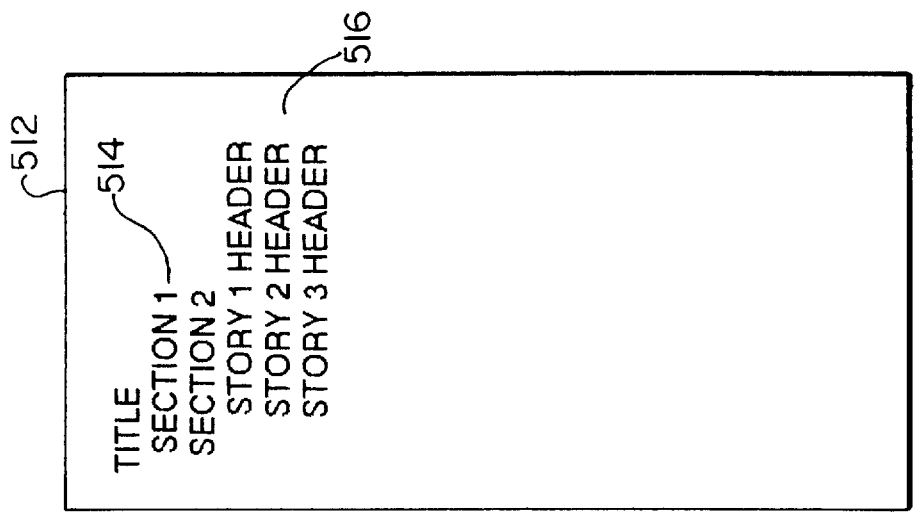
FIG. 9 is a block diagram of a title tree and a related outline control display region.
Figure 9A:
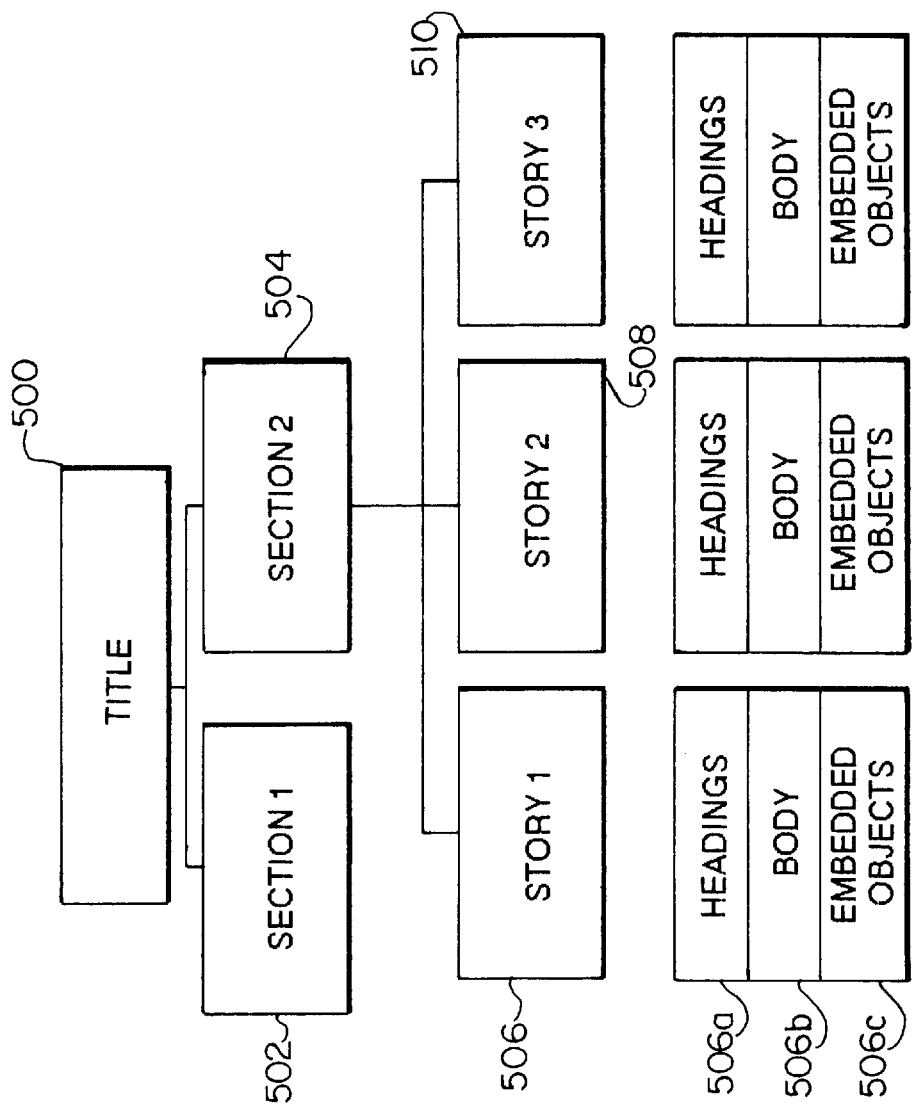

Referring now to FIG. 9, a title node 500 is shown with its constituent levels of sections and stories. Beneath the title node 500 are two section nodes 502, 504. Beneath the section node 504 are three story nodes 506, 508, 510. Each story node such as the node 506 may refer in the title tree to the following nodes: a headings node 506a, a body node 506b and an embedded object node 506c. Each one of these nodes in turn may refer to specific content values such as described below. The story was completed by the MPS document editor 188 shown in FIG. 2.

The publisher 102 will use the page editor 186 to specify the properties of the outline control. In the presently preferred embodiment of the outline control, the control properties include specific attributes of the content to display (also termed content values), which level of the title to start the outline and how many levels of organizational structure to display. Presently, the content values which can be chosen by the publisher 102 include section, abstract body, abstract heading, heading and table of contents (TOC). The outline control properties are stored in a page object (not shown) in the title COS.

The customer 160 uses the viewer 202 to display a page in the title. The page contains an outline control which presents a displayable region 512 in FIG. 9. The displayable region 512 includes text strings, which may be optionally indented. For instance, the very top-most entry could display the name of the title as a navigation link. Underneath the title are navigation links such as a link for Section 1 514 which corresponds to the node 502. At the same level of indentation is a navigation link for Section 2. Stories 1–3 headings appear at another level of indentation within Section 2 as will correspond to the title structure previously described.

To distinguish a link from other text in the outline control such as the title name, it may be displayed in a unique color or with emphasis such as underlining. When the customer clicks on the navigation link 514, the viewer traverses the link and finds the first page associated with that section and displays it. Of course, when the user clicks on a story heading such as 516, the first page corresponding to story 1 will be displayed.

Figure 10:
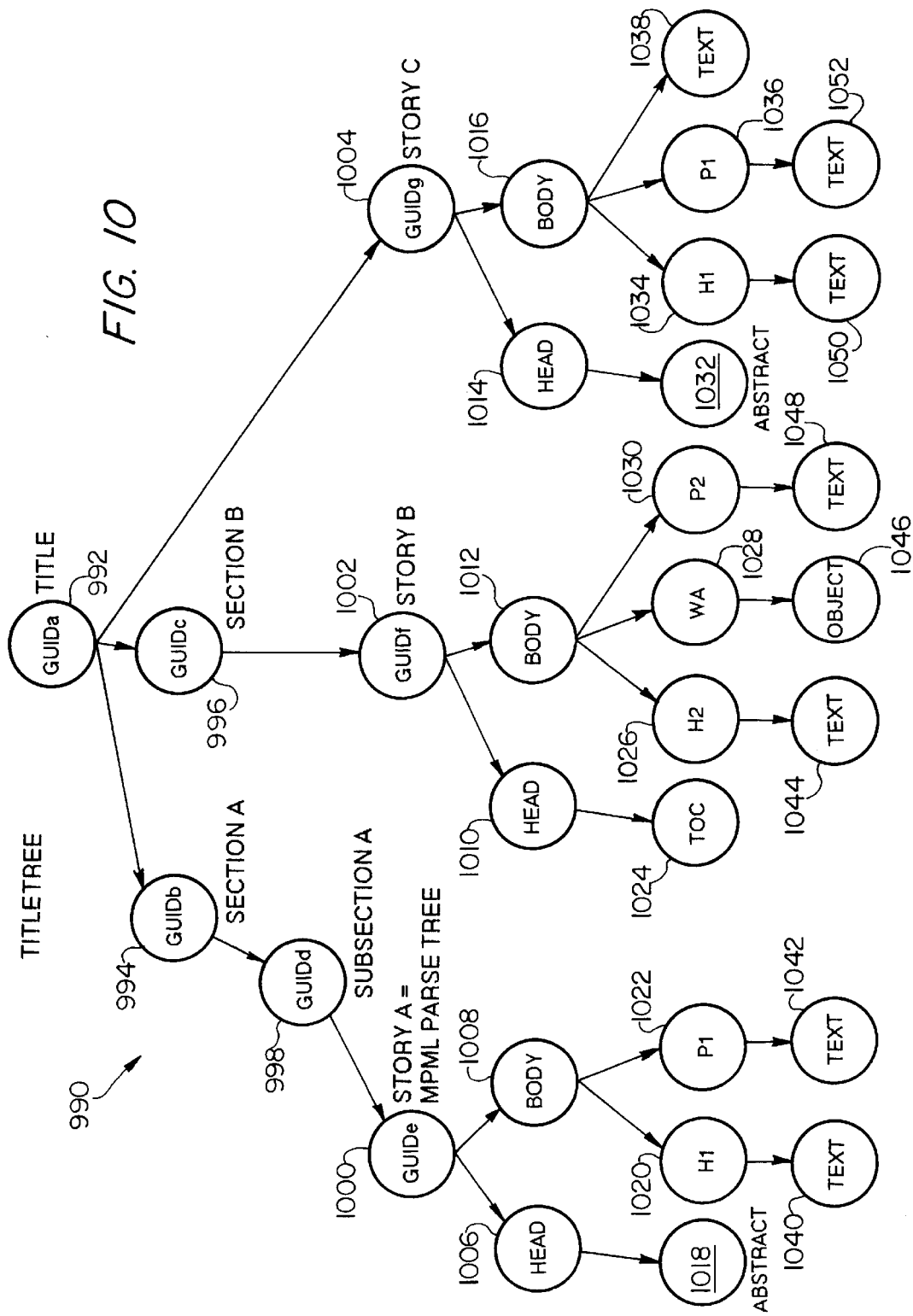
FIG. 10 is a diagram of a title tree showing the details of the story structures.

Referring to FIG. 10 a second exemplary title tree 990, that is different than the title tree described in conjunction with FIG. 9, will now be described. This title tree 990 is expanded to include exemplary MPML parse trees and also shows how the tree may not be symmetrical.

The title tree starts with a title root 992 having a GUIDa. Below the title root 992 are a section A represented by a node 994 having a GUIDb and a section B represented by a node 996 having a GUIDc. Typically, a title is arranged with sections, and some of the sections may have subsections. Stories are inserted into either of the sections or subsections. However, stories may also be placed directly below the title root in the title tree, as exemplified by story C represented by a node 1004 having GUIDg. Section 994 as a subsection represented by a node 998 having a GUIDd.

Below subsection 998 is a story A represented by a root 1000 having a GUIDe. As shown in FIG. 19, the root 1000 of story A is the root of a MPML parse tree. Below the root 1000 of story A are a head node 1006 and a body node 1008. The head node 1006 has a leaf node 1018 that, in this example, is the abstract section of the story A at root 1000. The body node 1008 has a Heading1 (H1) type of style represented by a node 1020. Below the heading style is a leaf node 1040 having text content for the story. The text content is in the form of a data stream. When instantiated by the Viewer 202 (FIG. 2), the style above it in the tree, style Heading1, will be applied to the content.

Also below body 1008 is a Paragraph1 (P1) style represented by a node 1020. The Paragraphi style has a leaf node 1042 below it that is also a data stream of text.

Below the section B node 996 is a story B represented by a root 1002 having a GUIDf. Below the story root 1002 is another MPML parse tree having a head node 1010 and a body node 1012. The head node 1010 has a table of contents (TOC) leaf node 1024. The body node 1012 has a Heading2 (H2) style node 1026, a Wrap Advertising (WA) style node 1028 and a Paragraph2 (P2) style node 1030. The Heading2 style node 1026 has a leaf node 1044 representing a text content stream. Below the Wrap Advertising style node 1028 is a leaf node 1046 representing an embedded object stream. The Paragraph2 style node 1030 has a leaf node 1048 for a text stream.

As previously mentioned, story C represented by root 1004 is immediately beneath the title root 992. Below the story root 1004 is a head node 1014 and beneath it is an abstract node 1032. Also beneath the story root 1004 is a body node 1016 having a Heading1 (H1) style node 1034, a Paragraph1 (P1) style node 1036 and a text stream leaf node 1038. Further, beneath the Heading1 style node 1034 is a text stream leaf node 1050. The Paragraph1 style node 1036 further has a text leaf node 1052 below it. As previously mentioned, all leaf nodes are streams. All nodes above the leaf node level of the title tree are storages.

V. OUTLINE CONTROL IMPLEMENTATION

This section will discuss an implementation of the outline control in the viewer 202 shown in FIG. 2. It will be understood that the outline control is but one way to implement the information map invention. The information map invention provides for the automated display of navigation links corresponding to an underlying structured layout and content. Thus, the outline control automates the display of navigation links in structured titles.

Figure 11:
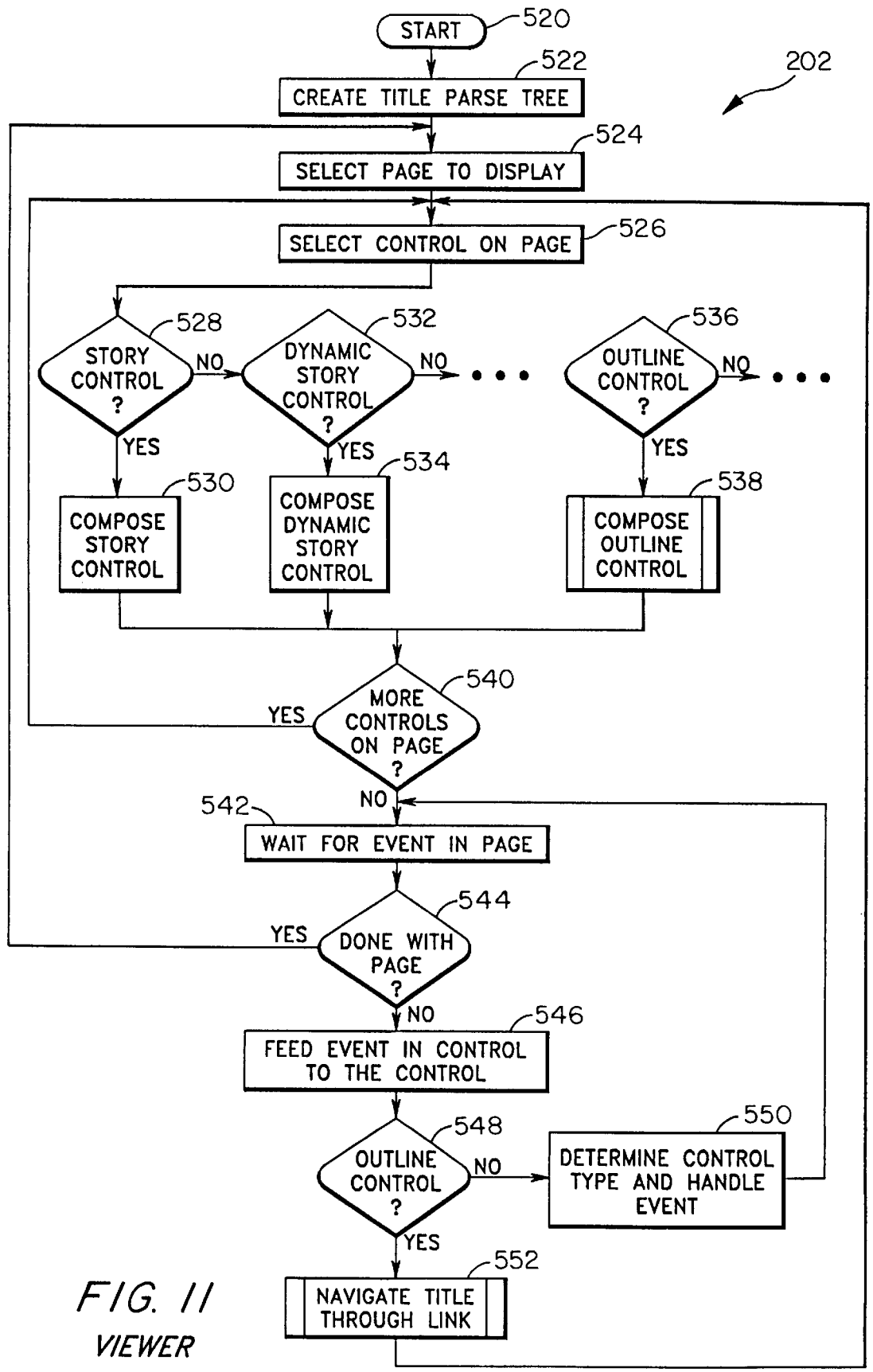
FIG. 11 is a flow diagram of the pertinent parts of the Viewer component shown in FIG. 2.

FIG. 11 is a flow diagram of the viewer 202 run by the customer 160 of the MPS. The diagram is used to provide a context for the outline control and, therefore, it will be understood there are many other functions provided by the viewer which are not shown. Beginning at a start state 520, the viewer 202 creates a title parse tree at state 522. Title parse trees were discussed with respect to FIGS. 9 and 10 above. The viewer moves to state 524 to display a page selected by the customer 102 and then to state 526 to select a control on the page.

If, as determined at the decision state 528, the control is a story control, then the story control is composed at state 530. Similarly, the states 532 and 534 are entered to compose a dynamic story control. Other types of controls may be processed and in fact an outline control may be handled via the states 536 and 538. In an object-oriented language which includes polymorphism, no specific inquiries are made as shown but rather the compose associated with that control is already determined. If there are more controls on the page (state 540), the viewer proceeds again to state 526 to select another control on the page. These states are executed repeatedly until there are no more controls on the page, in which case the viewer proceeds to state 542 to wait for an event in the page. Among other things, an event would include a mouse click by the customer running the viewer 202.

If the event indicates that the viewer should move onto another page as determined at the decision 544, the viewer proceeds back to select another page to display at state 524. On the other hand, assuming that the event will be handled by a control in the current page, the viewer moves to state 546 to feed the event in the display region of the control to the control. If, as indicated by state 548 the control is not an outline control, then the viewer determines the control type and handles the event at state 550. After the event is handled, the viewer proceeds back to state 542 to wait for another event. On the other hand, an event inside of the outline control display region (e.g., region 512 in FIG. 9), specifically a click on a navigation link, causes the invocation of the function 552 to navigate the title through the link. Once the link has been resolved and a new page is composed, as previously described, the viewer proceeds to again wait for an event in the page at state 542. The viewer process 202 cycles through the flow repeatedly until it is terminated.

Figure 12:
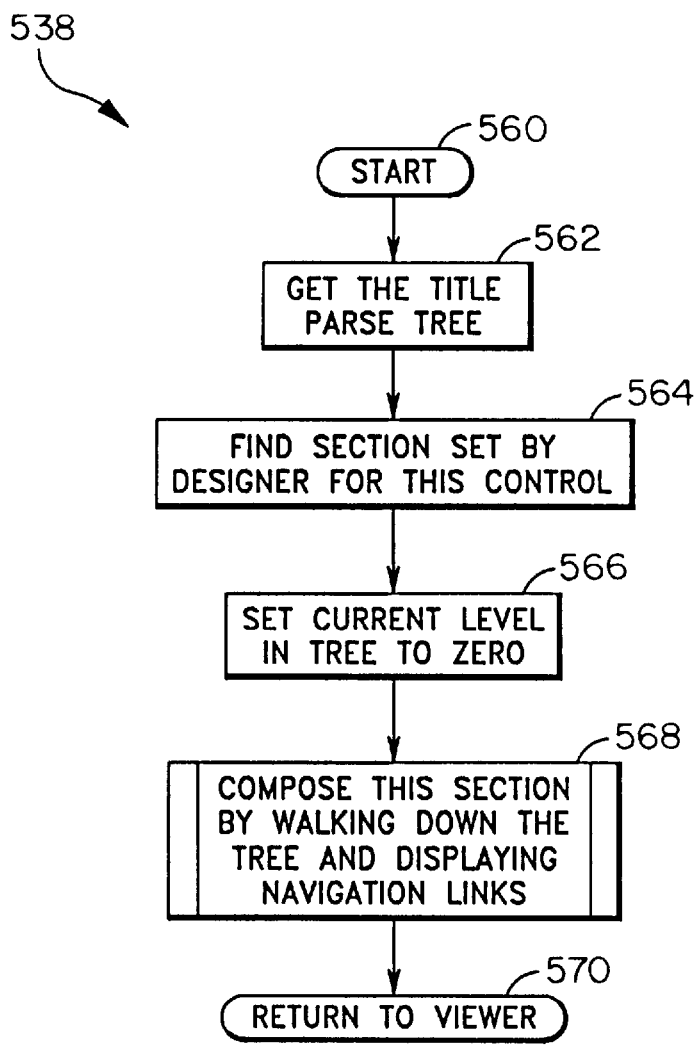
FIG. 12 is a flow diagram of the Compose Outline Control function shown in FIG. 11.

Turning to FIG. 12 the flow of the compose outline control function shown in the viewer flow of FIG. 11 will now be described. The compose outline control function 538 enters at the start state 560 and at state 562 gets the title parse tree. The title parse tree will have been created by the viewer previously. Once the root node of the title parse tree is obtained from the viewer, the compose function 538 finds the section set by the designer for this control at state 564. For example, with reference to FIG. 10, the designer could specify that the outline begin at the title, section A, section B, or subsection A. Moving to the state 566, the control function sets the current level in the tree to zero. The current level is a counter which is used in the following function to maintain track of where the composition is in the title parse tree. Then the compose function 538 invokes the function 568 to compose this section by walking down the title parse tree and displaying navigation links. After the function 568 has completed a display region, such as the region 512 in FIG. 9, it will have an outline of navigation links. The compose function 538 returns to the viewer at state 570 so that the viewer can await clicks on individual navigation links by the customer 102.

Figure 13B:
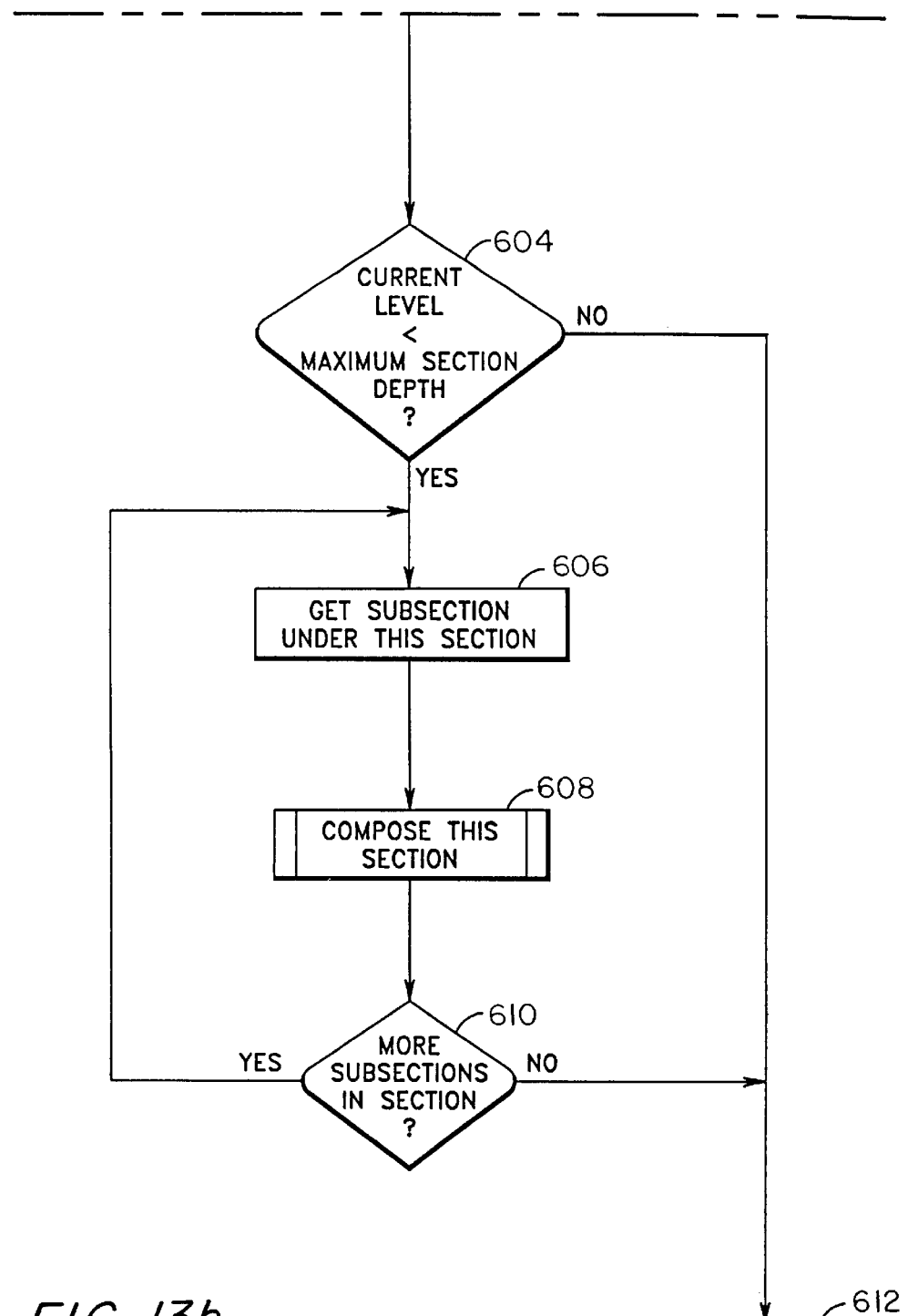
FIG. 13 is a flow diagram of the Compose This Section function shown in FIG. 12.

The compose this section function 568 will now be described with reference to FIGS. 13a and 13b. A section is composed by walking down the title parse tree and displaying navigation links associated with subsections and stories.

The compose this section function 568 enters its start state 580 and thereafter increments the current level counter at state 582. If a section display was requested by the designer (state 584), the text style for the section name is set from the style sheet associated with sections 1–9 based on the current level at state 586. For instance, at level 1 the default style sheet for the title will be used. The section name is then displayed in the control display region at state 588 and a link is created and registered with the viewer at the function 590. The display of the section is bypassed as shown in FIG. 13 at state 584 when the designer has specified that the section not be displayed.

A decision is made at state 592 as to whether the designer has specified the showing of content values. The present set of possible values are table of contents, abstract heading, abstract body and story heading 1. Any or all of these content values could have been set by the designer.

Assuming that the designer specified at least one of the content values to be displayed, the compose function 568 continues to a state 594 to get the first story in the section. The set content values is located at state 596 and the text style is located in the story's associated style sheet based upon the values at state 598. Next, the function 568 creates a link and registers it with the viewer at state 600. The creation of a link function will be discussed further with respect to FIG. 14.

If there are more stories in this section as determined in state 602 then the function loops back up to state 594 to get the next story in the section. If there are no more stories in the section as determined at state 602, or the showing of content values was not specified by the designer, the function 568 proceeds to a decision state 604. At state 604, a condition is tested as to whether the current level is less than the maximum section depth specified by the designer.

If the current level is not at the maximum section depth, function 568 proceeds to state 606 to get the first subsection under the current section. This subsection is then composed by recursively calling the compose this section function 568 at state 608. Upon completion of the recursive call, the function 568 continues to a decision state 610 to determine if there are more subsections in the current section. If there are more subsections, the function 568 loops back up to state 606 to get the next subsection and continues until there are no more subsections in the section. After completing the subsection composition or if the maximum section depth has been reached, the compose this section function 568 returns to the viewer at state 612.

Figure 14:
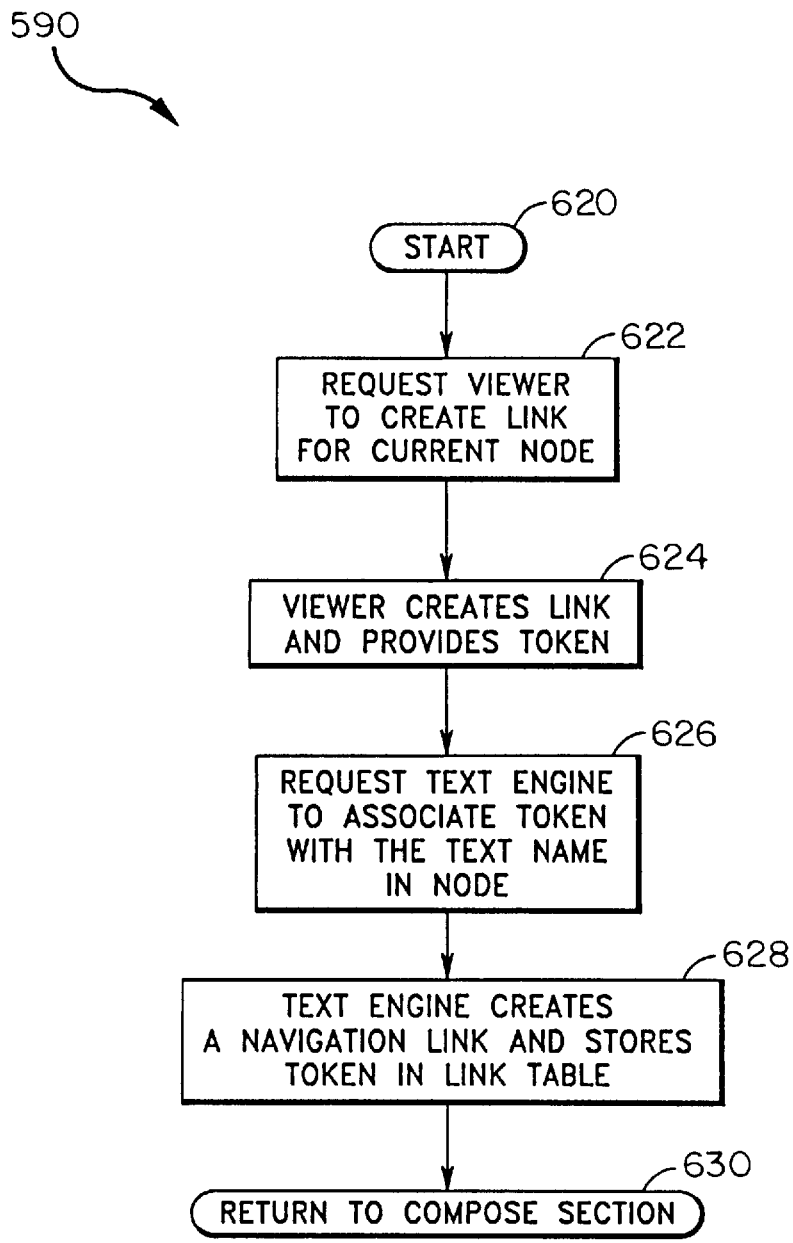
FIG. 14 is a flow diagram of the Create A Link And Register With Viewer function shown in FIG. 13.

FIG. 14 shows the control flow for the create a link and register with viewer function 590 which is referenced in FIG. 13a. The function 590 is entered at the start state 620 and requests the viewer to create a link for the current node at state 622. The viewer creates a link and provides a token to the outline control at state 624. The token is a unique identifier for the link and is presently represented as a 32-bit number. The outline control proceeds to state 626 to request a text engine to associate the token with the text name in the node. The text engine could be any of a number of commercial products such as one available from Stonehand of Cambridge, Mass. Continuing to state 628, the create a link function 590 has the text engine create a navigation link and stores the token returned from the viewer into a navigation link table maintained by the text engine. The function 590 proceeds to a state 630 where it returns to the compose section.

Figure 15:
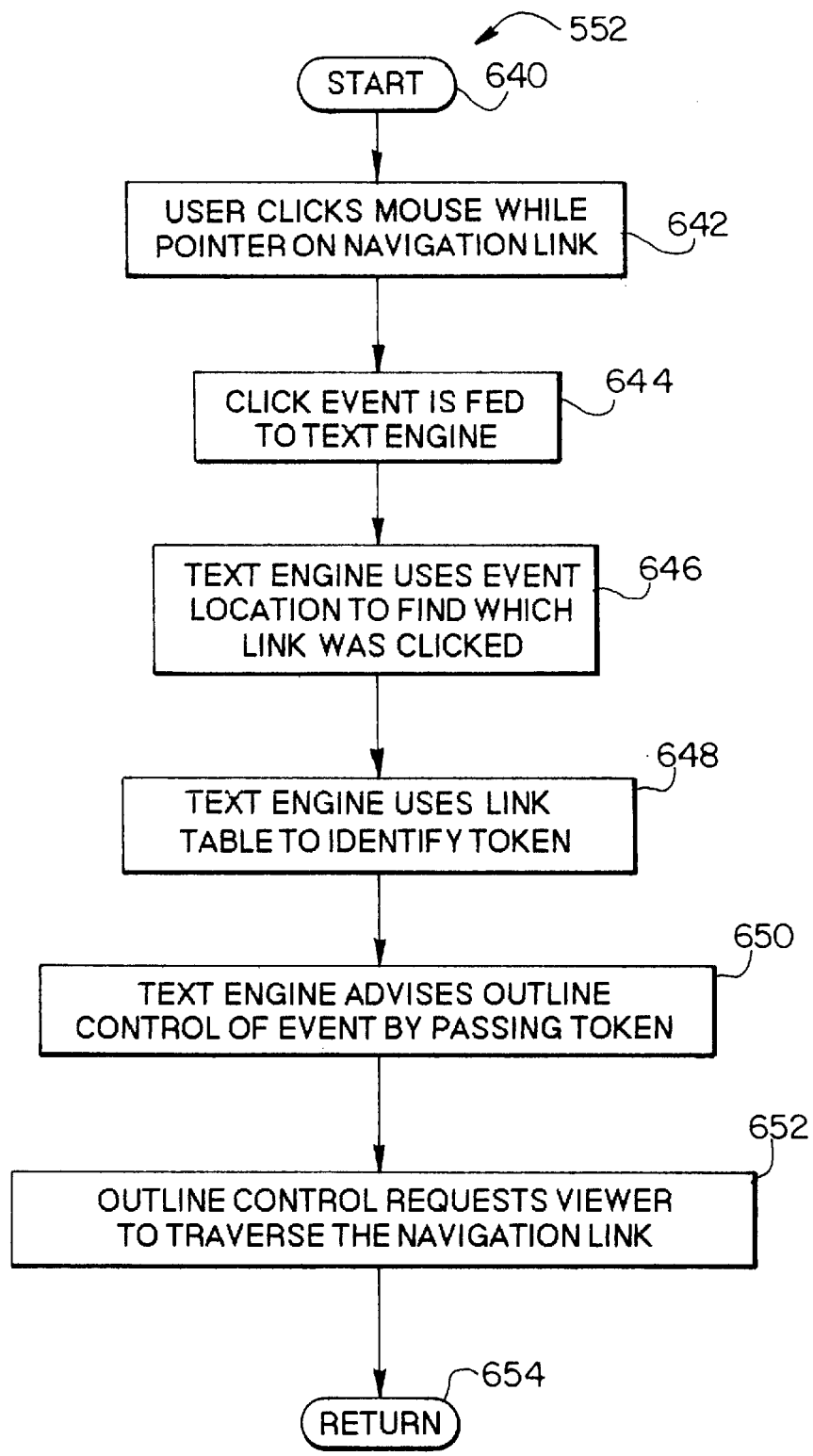
FIG. 15 is a flow diagram of the Navigate Title Through Link function shown in FIG. 11.

Turning to FIG. 15, the control flow is shown for the navigate title through link function 552 which is invoked by the viewer as shown in FIG. 11 when the customer 102 activates a navigation link in the outline control. Beginning at this start state 640, the navigate title through link function 552 continues to state 642 where the user clicks a mouse while the pointer is on the navigation link. The click event is fed to the text engine at state 644. The text engine uses the event location to find which link was clicked at state 646. Then, the text engine uses the navigation link table to identify a token at state 648. The text engine subsequently advises the outline control of the event by passing the token to the outline control at state 650. At state 652 the outline controls requests the viewer to traverse the navigation link which causes the system to select a new page to display and the function returns at the state 654.

To generalize the information map, the algorithm would be:

Infomap::Compose( )
        Get the structure information from the viewer
        Walk (structure)
    Infomap::Walk(structure)
        If I need to do something with this structure node, then create navigation link
        For each subnode in the structure Walk (substructure)

VI. ENCYCLOPEDIA TIMELINE IMPLEMENTATION

The information map invention can be applied in other publishing contexts outside of the MPS. In a multimedia encyclopedia, for instance, the information map can be applied to a timeline or a map. The timeline feature will be discussed with respect to FIG. 16 below.

The map feature allows for structured decent in a map of at least a portion of geographic region. Assuming that a political map of the earth is displayed by the multimedia encyclopedia, the encyclopedia user may click on a continent, for instance, and see a political structure hierarchically displayed in the form of countries, states, cities and so forth. The geographic structure would map into navigation links in which the user could easily traverse the geographic region.

Figure 16:
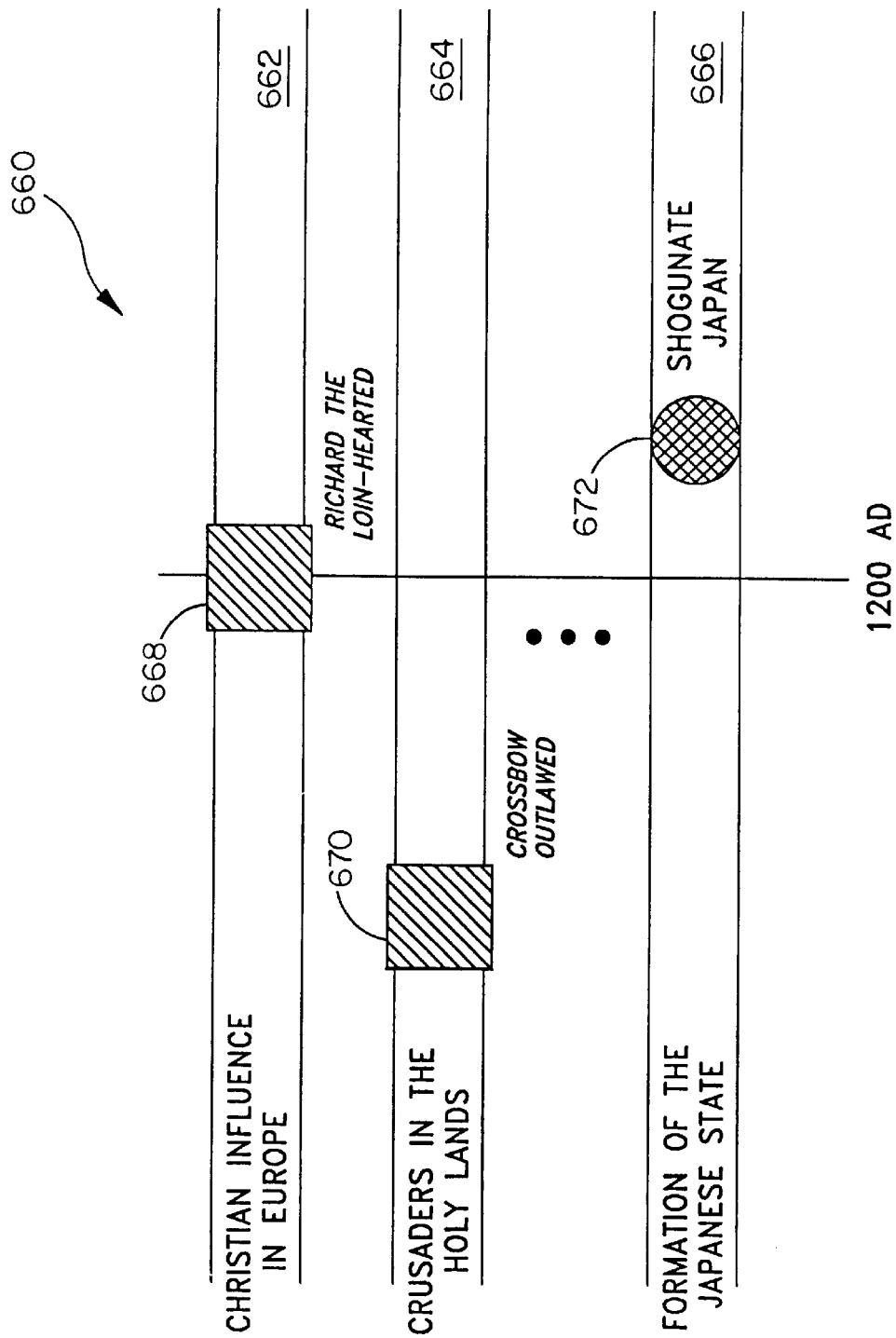
FIG. 16 is a diagram of a timeline embodiment of the information map in a multimedia encyclopedia.

FIG. 16 is a diagram showing a timeline 660 which would be associated with, for example, a multimedia encyclopedia. The Encarta encyclopedia published by Microsoft is an example of one such multimedia encyclopedia. In the timeline 660 there are several thematic timelines 662, 664 and 666. The icons 668, 670 and 672 which overlay each respective thematic timeline are navigation links according to the information map invention. The designer has established content values or find properties which have been set to be displayed by the timeline. Therefore, if the navigation link 668 is activated, an article discussing Richard the Lion-Hearted will appear in a pop-up window. As another example, when the globe icon 672 is activated by a mouse click, a pop-up menu will show the eastern hemisphere with a line encircling the islands of Japan.

One central benefit of the information map is to eliminate the tedious manual entry of navigation links by having the designer establish structure in a title which is then traversed by the information map to display navigation links associated with the structure.

VII. SUMMARY

In the MPS, new content does not need to be laid out by a designer before it can be published. It can be uploaded to the distribution point and downloaded to customers' machines as soon as the object is completed, since the rendering is automatically done on the consumers' machines based upon the designs in the title's page layouts. Also, since no rendering has been done prior to downloading the title and objects to the consumer's machine, the appearance of a new piece of content does not force the system to re-download any other items.

Information maps are implemented in the MPS as OLE controls (OCXs) which serve as navigational aids for traversing through a title and it's content. Information maps present a condensed view of the title structure and/or it's content which the users use to jump to content they find interesting by clicking on an entry. This is accomplished by extracting elements of the title structure and/or tagged content (as defined by the designer) and presenting them as hypertext-like links to the associated content. The specifics of the appearance of the items in an information map may be textual or graphical (or both) and is determined by the type of Infomap control.

The type of entries an information map displays are determined by the designer. The actual entries are dynamic and determined by the contents of the title parse tree when the information map is composed. Information maps can extract and display any element found in the title parse tree. This includes the sections defined in the title structure and tagged elements found in the content. For example, the designer can specify that the information map displays the current section name, the headlines, the abstract or TOC entries for the articles in the title. In addition, information maps have the concept of scope which limits the range of entries the information map displays. For example, the designer may scope an information map to the entire title in which case it would display an entry for each article found in the title. Alternatively, the information map could be scoped to the current section. In this case, the information map would display only entries for stories found within the current section of the title.

Information maps have their scope and the type of elements they display set when they are added to pages at design time. At runtime, the viewer invokes information map methods to render their contents. Information maps differ from other controls such as dynamic controls in that they display their entire contents when composed rather than cutting off composition after rendering a single page of output. As a result, information maps must support more than a single page worth of output and so are generally scrollable. Note this also implies that information maps require no special interface to notify the Viewer where it left off composing.

When told to compose by the Viewer, information maps obtain the title parse tree from it and navigate to the root node in the parse tree within their scope. For example, an information map scoped to the current section would navigate to the node in the parse tree defining the current section (after obtaining the current section name from the Viewer). An information map scoped to the entire title would just use the root node of the parse tree. After obtaining this node, the information map then walks the parse tree extracting the elements it's been told to collect and inserting a representation for each entry. For each entry inserted, the information map registers a link to the associated article (or section) with the Viewer. The Viewer returns a token to identify the text item which the information map tells the text engine to associate with a hot link it creates for the new entry. This token is unique per text item and any object which registers a link to that article will receive back the same token.

As the text entries are composed, information maps apply text formatting properties as assigned by the designer. However, the styles used by text based information maps are different than those normally used by other text controls. In an information map, the styles normally implied by the tag to style map are overridden. Information maps select which Style to use based on the type of entry it is rendering (section or tagged content) and it's current level. This provides the flexibility to determine a consistent look and feel for the entries in an information map which is independent from the type of elements it collects. Note: an item's level is defined as it's depth in the parse tree from the root node where the information map began composing. The designer has the option of setting the maximum number of levels to display entries for.

Information maps detect clicks on their entries and invoke the Viewer to resolve the target of the link associated with that entry. This is done by passing the token returned by the Viewer and stored in the text engine when the entry was composed. The Viewer knows how to resolve this token and takes appropriate action to display the content associated with it.

Although the invention has been described with reference to specific embodiments, the description is intended to be illustrative of the invention and is not intended to be limiting. Various modifications and applications may occur to those skilled in the art without departing from the true spirit and scope of the invention as defined in the appended claims.

We claim:

1. A method of generating a navigable outline for a title structure comprising a plurality of related nodes, the method comprising the steps of:
   (a) accessing the title structure;
   (b) finding a node in the title structure;
   (c) creating a navigation link to separate content associated with the node, wherein an initial node is at a selected starting level in the title structure; and
   (d) recursively descending the title structure for steps (b) and (c), wherein the recursive descent stops at a selected maximum depth.

2. The method of claim 1, comprising the additional step of creating the title structure.

3. The method of claim 1, wherein the title structure includes section and content value nodes.

4. The method of claim 1, comprising the additional step of activating the navigation link so as to navigate the title structure.

5. In the method of claim 4, wherein the activating step comprises clicking a mouse button while a pointer is on the navigation link.

6. The method of claim 1, wherein the creating step includes displaying a description of the node.

7. The method of claim 1, wherein the title structure is indicative of a publication.

8. The method of claim 1, wherein the title structure is indicative of a multimedia encyclopedia.

9. In an electronic publication system including a designer, a storage and a viewer, a method comprising the steps of:

creating a title layout including at least one page object;

creating a content object having a plurality of content values;

releasing the title layout and the content object as a title to the storage;

retrieving the title layout and the content object from the storage;

composing an outline of navigational links to the content values on the displayable page representation of the page object, the outline representative of the title layout and the content values and configurable in starting and ending levels; and moving through the title to content values by activation of one of the navigational links.

10. The method of claim 9, wherein the composing step includes displaying the outline of navigational links.

11. A method of displaying navigable links indicative of a title structure comprising sections with the sections containing stories and the stories having one or more content values, the method comprising the steps of:

a) accessing the title structure;

b) determining a selected depth for display of the navigable links;

c) if the selected depth includes displaying section names, then c.1) displaying one of the section names and c.2) creating a navigation link indicative of the one section name wherein selection of the navigation link indicative of the one section name moves a viewing window to the content value of the section;

d) if the selected depth includes displaying the content values of the stories, then d.1) locating a story in the title structure;

d.2) creating a navigation link indicative of the story, wherein selection of the navigation link indicative of the story moves said viewing window to the content values of the story.

12. The method of claim 11, wherein a type of content value is a heading.

13. The method according to claim 11, wherein steps c) and d) are performed recursively until at least one of the selected depth or the end of the title structure is reached.

* * * * *